United States Patent
Na

(10) Patent No.: US 12,431,561 B2
(45) Date of Patent: Sep. 30, 2025

(54) METHOD, APPARATUS AND SYSTEM FOR CAPTURING CARBON USING FUEL CELL

(71) Applicant: CARBON ENERGY INC., Daejeon (KR)

(72) Inventor: Si Young Na, Incheon (KR)

(73) Assignee: CARBON ENERGY INC., Daejeon (KR)

(*) Notice: Subject to any disclaimer, the term of this patent is extended or adjusted under 35 U.S.C. 154(b) by 0 days.

(21) Appl. No.: 18/746,489

(22) Filed: Jun. 18, 2024

(65) Prior Publication Data

US 2024/0339699 A1    Oct. 10, 2024

Related U.S. Application Data

(63) Continuation of application No. 18/377,276, filed on Oct. 5, 2023, now Pat. No. 12,046,737.

(30) Foreign Application Priority Data

Nov. 23, 2022    (KR) .................. 10-2022-0158737

(51) Int. Cl.
*H01M 8/04*    (2016.01)
*C25B 1/135*    (2021.01)
(Continued)

(52) U.S. Cl.
CPC .............. *H01M 12/06* (2013.01); *C25B 1/135* (2021.01); *C25B 1/23* (2021.01); *C25B 3/03* (2021.01);
(Continued)

(58) Field of Classification Search
CPC .............................. H01M 12/06; H01M 10/63
See application file for complete search history.

(56) References Cited

U.S. PATENT DOCUMENTS

| | | | | |
|---|---|---|---|---|
| 4,317,863 A | * | 3/1982 | Struthers ............. | H01M 12/065 429/523 |
| 2003/0143440 A1 | * | 7/2003 | Tao ..................... | H01M 8/0435 429/444 |

(Continued)

FOREIGN PATENT DOCUMENTS

| | | |
|---|---|---|
| JP | 2002246056 A | 8/2002 |
| JP | 4534278 B2 | 9/2010 |

(Continued)

OTHER PUBLICATIONS

Bae et al., "Hybrid seawater desalination-carbon capture using modified seawater battery system" 2019.
(Continued)

*Primary Examiner* — Olatunji A Godo
(74) *Attorney, Agent, or Firm* — Maschoff Brennan

(57) ABSTRACT

In the present disclosure, a method, an apparatus, and a system for collecting carbon using a fuel cell principle are disclosed. More specifically, the carbon capture device may comprise an air cartridge in which a gas including a carbon component is introduced; a fuel cartridge in which a fuel is injected; a fuel cell stack; a fuel supply line for supplying the fuel between the fuel cartridge and the fuel cell stack; and a controller, wherein the fuel cell stack may include: an anode unit including a fuel electrode for performing an oxidation reaction of the fuel supplied from the fuel supply line; a cathode unit including an air electrode for performing a reduction reaction of the gas introduced from the air cartridge; and an electrolyte unit including an electrolyte for transferring metal ions generated by the oxidation reaction of the fuel between the anode unit and the cathode unit. Various embodiments for collecting carbon and generating energy are disclosed.

17 Claims, 15 Drawing Sheets

(51) Int. Cl.
    *C25B 1/23*      (2021.01)
    *C25B 3/03*      (2021.01)
    *C25B 3/07*      (2021.01)
    *C25B 3/26*      (2021.01)
    *C25B 15/023*      (2021.01)
    *H01M 8/04111*      (2016.01)
    *H01M 8/0432*      (2016.01)
    *H01M 8/04492*      (2016.01)
    *H01M 8/04537*      (2016.01)
    *H01M 8/04746*      (2016.01)
    *H01M 10/42*      (2006.01)
    *H01M 10/63*      (2014.01)
    *H01M 12/06*      (2006.01)
    *H01M 16/00*      (2006.01)

(52) U.S. Cl.
    CPC ............ *C25B 3/07* (2021.01); *C25B 3/26* (2021.01); *C25B 15/023* (2021.01); *H01M 8/04111* (2013.01); *H01M 8/04335* (2013.01); *H01M 8/04507* (2013.01); *H01M 8/04634* (2013.01); *H01M 8/04761* (2013.01); *H01M 8/04776* (2013.01); *H01M 10/4242* (2013.01); *H01M 10/63* (2015.04); *H01M 16/006* (2013.01)

(56) References Cited

U.S. PATENT DOCUMENTS

| 2014/0038070 | A1 | 2/2014 | Papile |
| 2019/0118660 | A1 | 4/2019 | Shafer-Sull |
| 2020/0385874 | A1 | 12/2020 | Langley |

FOREIGN PATENT DOCUMENTS

| JP | 4680530 B2 | 5/2011 |
| KR | 10-2007-0042814 A | 4/2007 |
| KR | 10-2011-0114816 A | 10/2011 |
| KR | 10-2016-0034635 A | 3/2016 |
| KR | 10-2017-0008534 A | 1/2017 |
| KR | 10-1858158 | 5/2018 |
| KR | 10-1955692 | 3/2019 |
| KR | 10-2289495 | 8/2021 |

OTHER PUBLICATIONS

Jena et al., "Capturing carbon dioxide in Na—CO2 batteries: A route for green energy" Oct. 28, 2020.
Korean Office Action dated Dec. 20, 2024 as received in application No. 10-2023-0127831.
Korean Office Action dated Dec. 20, 2024 as received in application No. 10-2024-0014063.

\* cited by examiner

METHOD, APPARATUS AND SYSTEM FOR CAPTURING CARBON USING FUEL CELL

TECHNICAL FIELD

The present document relates to a carbon capture system and method using a fuel cell, and more specifically, to a technology of capturing carbon dioxide in air using a metal-air cell.

BACKGROUND ART

As a representative secondary battery that can repeatedly charge and discharge, a lithium-ion battery includes an anode using lithium oxide, a cathode that reversibly absorbs and releases lithium ions from the anode and acts to flow current through an external circuit, an electrolyte that moves lithium ions, and a separator that allows only ions to move through a fine pore inside.

In addition, fuel cells are used to generate electrical energy by electrochemically reacting a fuel (for example, metals) and oxidants (for example, air). Chemical reactions of fuel cells can be performed by a catalyst. Fuel cells can continuously generate power if fuel is supplied and functions of each component are normally operated.

For metal air batteries, specific metals (for example, iron, zinc, magnesium, aluminum) can be used for the anode and air electrodes can be used for the cathode. Since the metal air battery uses air as an active material for the cathode, it can be relatively light in weight compared to pre-fueled cells.

Meanwhile, due to the increasing environmental concerns, a carbon direct capture (or, direct air capture, DAC) and carbon capture and storage (CCS, hereinafter, referred to as "carbon capture storage") technology have been actively studied recently. Carbon direct capture refers to technologies and systems that chemically and physically capture and remove carbon dioxide, a major contributor to global climate change, directly from the Earth's atmosphere using machines and devices. Carbon capture storage (CCS) refers to technologies and systems that remove, capture, store, and utilize carbon dioxide from gases such as exhaust gases using physical or chemical methods.

Carbon capture storage (CCS) and direct air capture (DAC) are attracting attention as direct solutions for solving global climate changes, and they can be used in complementary manner.

DISCLOSURE

Technical Problem

In the present document, as a method for solving global climate changes, a method of applying carbon capture technology to fuel cell technology is disclosed. In order to continuously absorb carbon in the atmosphere using the fuel cell system, continuous supply of fuel to be supplied and removal of carbon compounds generated as battery by-product are required.

For fuel cells, metals may be used as fuel, and general metals may be present in a solid state at room temperature. Solid fuel may be difficult to be introduced into the fuel cell system due to the size thereof, and in the case of a solid metal, it may be difficult to separate and introduce metal.

Since the solid has a relatively small surface area compared to a liquid or gas, the solid may have low reactivity with air in the fuel cell system. In case that a metal with a relatively high reactivity such as an alkali metal is used to increase reactivity, there may be limitations in that the fuel is consumed by reacting with air before being introduced into the fuel cell system or it is difficult to manage.

In addition, the fuel metal and air react to form carbon captures containing carbons to be captured in the atmosphere, and carbon compounds may be generated and accumulated in the cathode unit or the air electrode. Since the carbon compound accumulated in the air electrode makes it difficult to function as an electrode by lowering electrical conductivity, it may be necessary to periodically replace the air electrode. However, since the air electrode is inside the fuel cell system, it may be difficult to replace only the air electrode, and it may not be reasonable to replace the entire fuel cell in terms of environmental aspects or costs when the remaining components (e.g., the electrolyte unit, the separator, and the fuel electrode) have a good condition.

According to various embodiments of the present disclosure, a metal-air fuel cell with direct air capture (DAC) and carbon capture and storage (CCS) functions is provided. The present invention can be continuously used while directly capturing carbon dioxide from the air, and addresses the problems of prior art ion cell and metal-air cell technologies that require energy-consuming and technically complex devices.

Meanwhile, the technical problems to be solved in the present disclosure are not limited to the above-described technical problems, and the problems not mentioned may be clearly understood by those skilled in the art to which the disclosure belongs from the present specification and the accompanying drawings.

Technical Solution

The carbon capture device according to an embodiment of the present disclosure comprises an air cartridge in which a gas comprising a carbon component is introduced; a fuel cartridge in which a fuel is injected; a fuel cell stack; a fuel supply line supplying the fuel between the fuel cartridge and the fuel cell stack; and a controller, wherein the fuel cell stack comprises: an anode unit comprising a fuel electrode in which an oxidation reaction of the fuel supplied from the fuel supply line takes place, and a cathode unit comprising an air electrode in which a reduction reaction of gas introduced from the air cartridge takes place, wherein a carbon capture product is generated based on the reduction reaction in the cathode unit; an electrolyte unit comprising an electrolyte to transfer metal ions generated by the oxidation reaction of the fuel between the cathode and the cathode, wherein the cathode unit comprises an electrode exchange module to replace the air electrode, and wherein the controller is configured to: control supplying of the fuel supplied to the anode unit through the fuel supply line, control supplying of the gas transferred to the cathode unit, and determine whether to replace the air electrode or the electrolyte unit based on the carbon capture product.

The controller may be configured to control a temperature of the fuel cartridge to make the injected fuel in a liquid or gaseous state, transfer the liquid or gaseous fuel to the anode unit using the fuel supply line, control generating of the carbon capture product based on a chemical reaction of the gas and the metal ions in the cathode unit, and use energy generated from the chemical reaction in the cathode unit to control the temperature of the fuel cartridge.

Further, the controller may be set to control a temperature inside said fuel cell stack such that the carbon capture product generated in the cathode unit can be discharged through the fuel supply line in a fluid state, and discharge the carbon capture product in the fluid state outside using the fuel supply line.

Further, the controller may be set to determine to replace the electrolyte unit based on the electrical conductivity of the air electrode being less than a predetermined level or replace the air electrode based on the amount of the carbon capture product accumulated in the air electrode exceeds a specified level.

Further, the controller unit may be configured to output information to a user indicating that the replacement is necessary based on the determination to replace the air electrode or the electrolyte unit.

The air electrode may be physically connected to the electrode replacement module, and is configured in a cartridge form or a compartment form to be separated from the cathode unit, and the controller may be configured to separate the air electrode automatically by operating the electrode replacement module based on the determination to replace the air electrode.

Further, the controller may be configured to control at least any one of a pressure of fuel supply, a flow rate, a temperature at which a state of the fuel can be maintained in a liquid or gaseous state, or a supply amount.

Further, the air cartridge may comprise: an air fan; an air filter; and an air control module, wherein the air fan collects air and carbon dioxide in atmosphere into the air cartridge through rotation, wherein the air filter filters the air collected through the air fan, and wherein the air control module is configured to measure a state of air including at least one of temperature, humidity, or wind speed, and control at least one of a rotation speed of the air fan, an air compression ratio, a pressure in the carbon capture device, or a flow rate in the carbon capture device based on the measured state of the air.

Further, the fuel cartridge may comprise: a heating module; a chamber; and a fuel injection module, wherein the heating module is configured to sense a temperature inside the chamber and supply heat to the chamber, wherein the chamber stores the fuel introduced, and heats the fuel inside the chamber using the heat transferred from the heating module, and wherein the fuel injection module is connected to the fuel supply line to discharge the liquid or gaseous fuel outside of the fuel cartridge.

The fuel injection module may use a compressor or a pump to introduce pressure to supply fuel to the anode unit of the fuel cell stack, and wherein the controller is configured to: retrieve the fuel that has not burned in the fuel cell stack through the fuel supply line, heat the retrieved fuel at the fuel cartridge, and supply the fuel back to the fuel cell stack.

The carbon capture device may further comprise a battery, wherein the battery may store electrical energy generated in the fuel cell stack, and supply the stored electrical energy to the fuel cartridge, or transfer the stored electrical energy to outside.

The carbon capture device further comprises at least one line separate from said fuel supply line, and the controller may be configured to move the carbon capture product generated in the cathode unit or the electrolyte in the electrolyte unit using the at least one line.

The fuel supply line may be formed with a curve, supplying liquid or gaseous fuel to the fuel cell stack, and retrieving unburned fuel to the fuel cartridge again, and discharge the carbon capture product generated in the cathode unit.

The fuel may comprise at least one of a metallic fuel, a metal salt, an alloy, or an electride, and the fuel may comprise as a component at least one of Li, Na, K, Rb, Cs, Fr, Be, Mg, Ca, Sr, Ba, Ra, Al, Sn, Zn, Cu, Pb, Ag, Ni, Cd, Fe.

The fuel electrode in the anode unit or the air electrode in the cathode unit may include at least one of a carbon electrode, a graphite electrode, a metal-carbon composite electrode, a nanomaterial electrode, a catalyst composite electrode, a catalyst electrode, a semiconductor material electrode, a polymer electrode, a metal mesh-shaped electrode, an organic/inorganic composite material electrode, a liquid-type electrode, a transition metal dichalcogenides (TMD) electrode, a graphene electrode, a carbon nanotube (CNT) electrode, or an oxide metal species electrode.

It should be appreciated that the means for solving the problem provided in the present disclosure are not limited to those described above, and that means for solving the problem not mentioned will be apparent to one of ordinary skill in the art to which the present disclosure belongs from this specification and the accompanying drawings.

Advantageous Effects

According to an embodiment included in the present document, a metal-air fuel cell having direct air capture (DAC) and carbon capture storage (CCS) functions is provided. It can be used continuously while directly collecting carbon dioxide in air, and solve problems of conventional ion batteries and metal-air battery technology.

According to an embodiment included in the present document, an open cell metal-air fuel cell and system that produces new renewable energy and reusable mineralization resources through electrochemical oxidation and reduction reactions using carbon dioxide as a fuel and directly remove carbon dioxide in air and exhaust gas to carry out carbon neutral and carbon negative for overcoming the global climate change crisis can be provided.

According to an embodiment included in the present document, electrical energy can be produced using carbon dioxide as a fuel and mineralized metal carbonate resources can be produced and obtained from an air electrode while collecting carbon dioxide.

According to an embodiment included in the present document, a secondary battery that can be used continuously can be provided with a metal-air battery having a high energy density. That is, the metal-air fuel cell of the present document has an open cell structure, so that fuel metal can be continuously supplied and replaceable air electrodes can be included, so that electricity can be supplied while directly collecting carbon dioxide in air during the discharge process and metal carbonate resources can be produced from the replaced air electrodes, contributing from a commercial, economic, and environmental point of view.

More specifically, the carbon capture system of the present document has a structure configured to replace the air electrode, so that only the air electrode can be replaced conveniently. In addition, the carbon capture system can reduce the cumbersome of replacing the air electrode due to the deterioration of the performance of the air electrode by increasing the replacement cycle by discharging the carbon compound to the outside, and reduce the cost of replacing the air electrode.

The carbon capture system of the present document can increase the reaction speed of the fuel than when the fuel is supplied in a solid state by supplying the metal fuel (e.g., sodium) that has changed to a liquid or gas state using pressure, and make the fuel input process more convenient.

The carbon capture system of the present document can block the metal in the liquid or gas state from the outside until it is inputted into the carbon capture system to prevent the reaction and damage of the fuel.

The carbon capture system and method of the present document can be applied to the existing fuel cell stack and system as it is since the state of the fuel supplied is only changed to a liquid or gas in the case where the fuel cell is configured in the form of a solid oxide fuel cell (SOFC) or molten carbonate fuel cell (MCFC).

The carbon capture system of the present document can reduce the cost of supplying heat by utilizing heat or energy produced by the power generation of the fuel cell to the state transformation of the fuel cell, rather than releasing it.

The carbon capture system and method of the present document uses the same fuel cell stack and system as the existing fuel (e.g., hydrogen, urban gas, LNG, biomass), but can increase the reaction between the fuel and air using a relatively highly reactive metal fuel (e.g., alkali metal) compared to the existing fuel. The carbon capture system and method need not use expensive materials (e.g., precious metal) that have been used to increase chemical reactivity in the air electrode due to the high reactivity.

The carbon capture system and method of the present document can reduce the cost for carbon capture while lowering the manufacturing cost of a fuel cell through cost reduction.

Meanwhile, the effects of the present disclosure are not limited to the above-described effects, and the effects that are not mentioned can be clearly understood by those skilled in the art to which the present disclosure pertains from the specification and the accompanying drawings.

MODES OF THE INVENTION

Figure 1:
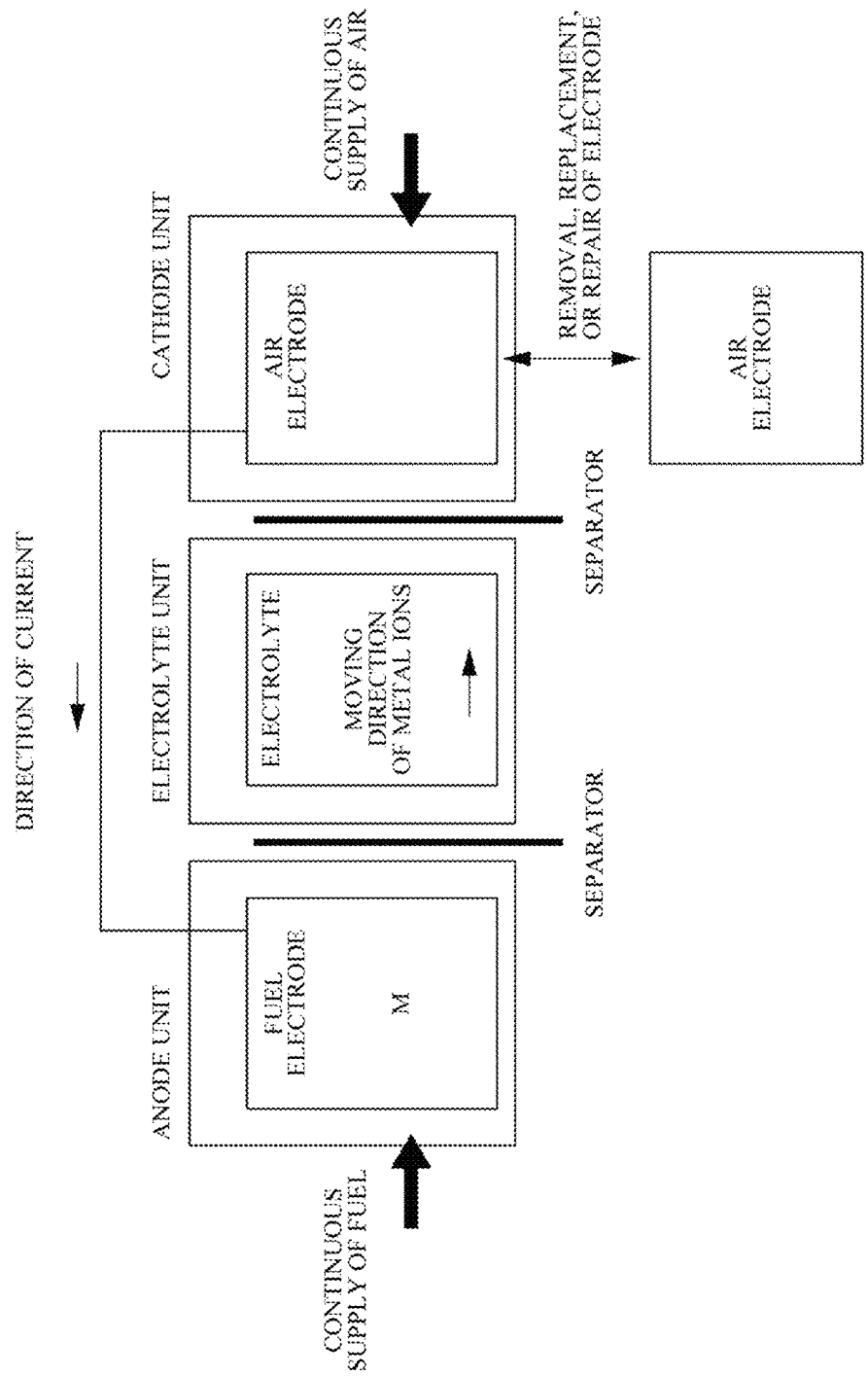
FIG. 1 is a configuration diagram of a metal-air fuel cell in the form of an open cell according to an embodiment of the present disclosure.

Hereinafter, embodiments will be described in detail with reference to the accompanying drawings. However, various changes may be made to the embodiments, so the scope of the patent application is not limited or limited by these embodiments. It should be understood that all changes, equivalents, and alternatives to the embodiments are included in the scope of the present disclosure. The suffixes "module" and "unit" for components used in the present document are assigned or used only for ease of description and are not intended to have a distinct meaning or role by themselves.

The terminology used in this document is for the purpose of describing the concept of the invention included in this disclosure and the embodiments thereof, and is not intended to limit the present invention to only the dictionary or phrase meaning of the term. For example, in this document, a singular expression may include a plurality of expressions unless the context clearly dictates otherwise. In addition, in this document, the terms "include" or "have" means the presence of any configuration, step, operation, or combination thereof, and do not exclude the presence or addition of other configurations, steps, operations unless the context clearly dictates otherwise.

Unless otherwise stated in this document, "connected" or "connected" may include one element/feature directly connected or connected to another element/feature or indirectly connected or connected to another element/feature via another element/feature, and does not necessarily mean just mechanically connected or connected. Therefore, while the various schematic diagrams illustrate example arrangements of elements and components, additional intervening elements, devices, features, or components may exist in the actual embodiment.

In general, carbon dioxide in the atmosphere is not concentrated enough to realize direct carbon capture, and a large amount of energy may be consumed to directly capture carbon dioxide in the atmosphere. When fossil fuel is used to generate energy used in this case, the amount of carbon dioxide generated to capture the carbon dioxide may be higher than the amount of carbon dioxide captured, as the carbon dioxide in the atmosphere will increase. In addition, if the carbon dioxide captured through carbon capture and storage technology is captured in gaseous form, methods such as oil field injection or land burial may be used, which may cause problems such as re-spillage and may not result in substantial carbon savings.

The carbon capture system according to the present disclosure captures carbon in the form of a stable solid carbon compound, so that it is easy to handle carbon in the atmosphere, such as landfill, so that carbon in the atmosphere may be substantially reduced.

Hereinafter, the principle of capturing carbon using the fuel cell system according to an embodiment of the present disclosure will be described.

A cell is a device that converts chemical energy into electrical energy and may include an anode, cathode, separator, and electrolyte. The anode is called a "fuel electrode" or "oxidation electrode" because it provides electrons by an oxidation reaction, and can be made of metals such as zinc, lead, cadmium, and lithium, which has rich free electrons. The cathode (or "reduction electrode") is the electrode that receives electrons from the anode and undergoes a reduction reaction in response to ions delivered through the electrolyte, and ceramics such as oxides and sulfides with sufficient space to accept ions can be used as the cathode material. If the anode and cathode come into contact, the chemical reaction can generate heat and ignite, so a separator is required to prevent contact between the anode and cathode, and the electrolyte unit may serve as a medium for ion conduction and as a pathway for which hydrogen ions or metal ions move.

FIG. 1 is a configuration diagram of a metal-air fuel cell in the form of an open cell according to an embodiment of the present disclosure.

The discharge of the metal-air cell according to an embodiment of the present disclosure is spontaneously performed through an electrochemical redox reaction between metal and air. In the metal-air cell, the anode unit may include a metal supplied as fuel as a fuel electrode, and the cathode unit may include an air electrode supplied with air.

In the anode unit or the oxidation electrode, the metal (M) is ionized, and ions flow through the electrolyte, and electrons flow through the electric wire. In the cathode unit, a carbon capture product may be generated through a chemical reaction between the metal and oxygen and carbon dioxide in the air, starting with the production of superoxide generated by the reduction reaction of oxygen. The generated carbon capture product may include a metal carbonate ($M_a(CO_3)_b$, such as $Na_2CO_3$) as a carbon compound. Meanwhile, the carbon capture product generated through the fuel cell of the present disclosure may include a $C_1$ compound composed of one carbon atom including carbon monoxide (CO), formic acid (HCOOH), and formaldehyde ($CH_2O$), and a $C_2$ compound composed of two carbon atoms such as ethylene ($C_2H_4$), ethanol ($C_2H_5OH$), and the like, and in addition to the above examples, organic compounds comprising carbon atoms may be generated as carbon capture products.

The carbon compound generated in the reaction may be formed irregularly in the air electrode (cathode). The generated carbon compound is non-conductive and highly stable with low reactivity, which limits its electrochemical decomposition, thus enabling stable carbon capture.

The solid metal carbonate produced in the present disclosure is an important mineral resource or chemical material and may be reprocessed or used for industrial use, or may be reused as a metal fuel of the fuel cell according to an embodiment of the present disclosure by reprocessing the metal carbonate.

Furthermore, even when buried in the ground, the solid metal carbonate is a mineralized solid, which reduces the likelihood that the captured carbon dioxide will leak back into the air due to factors such as soil deformation, cracking, erosion, ground movement, earthquakes, etc. In other words, the metal carbonate obtained by the present disclosure is a solid, which is easier to handle than a gas, and consequently has advantages such as economy and convenience in landfilling, handling, and distribution. Therefore, there is an additional effect of reducing the energy consumption that may occur in the process of handling and distributing the carbon dioxide capture resultant and the resultant additional carbon generation amount.

The redox reaction between metal and air of the present disclosure may ultimately result in the generation of electrical energy and carbon compounds (e.g., metal carbonates), and carbon capture may be performed. According to the present disclosure, carbon can be continuously captured through a continuous supply of metal fuel and replacement of the air electrode, and the generated electrical energy can be directly utilized in the carbon capture process, thereby improving energy efficiency and realizing practical carbon negativity.

Referring now to FIG. 1, an open-cell metal-air fuel cell and system is disclosed that includes an anode unit comprising a fuel electrode (metal electrode), a cathode unit comprising an air electrode, an electrolyte unit delivering metal ions as an intermediate carrier between the electrodes (which may include any combination of possible electrolyte compositions, such as organic, inorganic, solid, liquid, or any mixture thereof), and a separator unit separating each of these components. The separator unit may include an arbitrary separator that functions as a separator. In one embodiment, the electrolyte unit may be integrally formed with the separator unit. Also, in one embodiment, a plurality of electrolyte units and/or separator units may be present.

According to an embodiment of the present disclosure, the metal-air fuel cell may include a first opening in which external gases of the metal-air fuel cell including carbon dioxide are introduced and a second opening in which metal as a metal fuel is introduced. The cathode unit may be supplied with carbon dioxide from the external gas introduced through the first opening. In addition, the anode unit may be supplied with metal, which is a metal fuel, through the second opening.

The open-cell metal-air fuel cell and system of the present disclosure can produce electrical energy using metals and carbon dioxide/oxygen as fuel and directly capture and remove carbon dioxide from the air.

Referring to FIG. 1, the anode unit, which is a fuel electrode, is provided with a continuous supply of metal as a metal fuel. The cathode unit, which is an air electrode, is provided with a continuous supply of a gas (e.g., air) containing oxygen and carbon dioxide. Between the cathode unit and the anode unit, there may be an electrolyte unit capable of moving metal ions between the two electrodes. The electrolyte unit may include a configuration in which electrolyte is continuously supplied to and circulated to the electrolyte unit when a liquid state electrolyte is used. The anode unit, the electrolyte unit, and the cathode unit may be separated from each other by a separator.

Metals supplied as metal fuel in the fuel cell of the present disclosure may be any material and form with reactivity and conductivity suitable for a metal-air fuel cell. Such material and form may include, for example, at least one of alkali metals such as lithium (Li), sodium (Na), potassium (K), rubidium (Rb), cesium (Cs), francium (Fr), or beryllium (Be), magnesium (Mg), calcium (Ca), strontium (Sr), barium (Ba), radium (Ra), aluminum (Al), tin (Sn), manganese (Zn), copper (Cu), lead (Pb), silver (Ag), nickel (Ni), cadmium (Cd), or iron (Fe). Alternatively, alloy compounds, such as Nak, may also be used as fuel. The above listed materials are only examples, and any materials and forms with reactivity and conductivity suitable for metal-air fuel cells are not limited thereto. The metal fuel can be supplied to the anode unit and ionized in the anode through oxidation reaction, as described later.

The anode unit, which is a fuel electrode, can function as an anode where an oxidation reaction occurs. A metallic fuel can be supplied to the anode unit.

The cathode unit, which is an air electrode, can function as a cathode where a reduction reaction occurs. The cathode unit may be supplied with air.

The fuel electrodes (anode) and the air electrodes (cathode) can be consisted of any material and form with suitable reactivity, conductivity, or semi-conductivity for metal-air fuel cells. For example, it can be a carbon electrode based on carbon, and it can be implemented as composite materials including a metal and a material having other conductivity other than carbon. In an embodiment, the fuel electrode (anode) and the air electrode (cathode) may comprises metals, graphite, metal-carbon composite, single materials, composite materials, silicon-based catalyst composite, catalyst electrode, semiconducting material electrode, polymer electrode, nanomaterial electrode, metal mesh type electrode, organic/inorganic composite material electrode, liquid type electrode, transition metal dichalcogenides (TMD) electrode, graphene electrode, carbon nanotube (CNT) electrode, and metal oxide species electrode, or the like. Further, the fuel electrode (anode) and the air electrode (cathode) of the present disclosure can use electrode materials or collector materials of known secondary cells, fuel cells, and the like, and preferably have chemical resistance and corrosion resistance. This is only an example, and the materials used as the fuel electrode (anode) and the air electrode (cathode) are not limited to this.

An electrolyte unit that delivers metal ions as an intermediate transporter may be any material and form suitable for metal-air fuel cells, which has properties to deliver metal ions between the anode and the cathode. The electrolyte unit may include a solid electrolyte, a gel-state electrolyte, a water-soluble electrolyte, an organic-based electrolyte, or the like, and may be configured in a composite electrolyte form including one or more of them. Here, the composite electrolyte should be capable of moving/exchanging the oxidized cations of metal fuel used in the fuel cell of the present disclosure, and should have excellent ionic conductivity. It is also preferable to use materials and substances with excellent corrosion resistance/chemical resistance.

According to an embodiment of the present disclosure, the electrolyte unit may comprise a first electrolyte located on the fuel electrode side and a second electrolyte located on the air electrode side. In this case, the first electrolyte may include an organic electrolyte, and the second electrolyte may include an aqueous electrolyte. That is, the electrolyte unit of the present disclosure may be composed of a mixed (hybrid) electrolyte.

Materials that can be used in the electrolyte portion of the present disclosure is listed as follows: solid-state separator/electrolyte materials capable of transferring and exchanging metal fuel ions used in the fuel cells of the present disclosure, such as LiSICON and NaSICON; beta-alumina materials for use with sodium (Na) metal fuels; other aluminum oxide materials; metal fuels used in the present disclosure, such as LiS, NaS, and KS; sulfide-based and chalcogenate-based materials including sulfur(S), selenium (Se), tellurium (Te), polonium (Po), and Livermorium (Lv); solid polymer electrolyte materials utilizing organic materials such as PEO, boron hydride-based electrolyte materials comprising the metal fuels used in the present disclosure and BnHn anions; organic-based electrolyte materials comprising metal salts used in secondary batteries and organic solvents, additives, and the like; or a combination of at least one of these materials.

More specifically, the organic-based electrolyte that can be used in the embodiments of the present disclosure can include any one or more of the following materials, but is not limited to the following examples.

Cyclic carbonate types: ethylene carbonate (EC), propylene carbonate (PC), butylene carbonate (BC), vinyl ethylene carbonate (VEC), etc.

Chain carbonate types: Ethylene carbonate, propylene carbonate, dimethyl carbonate, ethylmethyl carbonate, diethyl carbonate, etc.

Ether-based substances: 1,2-dimethoxyethane, 1,3-dioxolane, diethylene glycol dimethyl ether, tetraethylene glycol dimethyl ether, dibutyl ether, tetraglime, diglime, dimethoxyethane, 2-methyltetrahydrofuran, tetrahydrofuran, etc.

Ester-based substances: methylacetate, acetate, n-propylacetate, dimethylacetate, methylpropionate, ethylpropionate, γ-butyrolactone, decanolide, valerolactone, mevalonolactone, caprolactone, etc.

Alcohol-based substances: methyl alcohol, ethyl alcohol, isopropyl, etc.

Amines: A liquid ammonium-based substance selected from the group consisting of ethylenediamine, propylenediamine, methylenediamine, ethylamine, 1,2-dimethoxyethane, hexamethylenimine, diisopropylamide, diethanolamine, oleylenamine, and combinations thereof; or, selected from the group consisting of ethylenediaminetetraacetic acid, diethylenetriamine acid, diaminohydroxypropane tetraacetic acid, and combinations thereof; or, tertrahydrofuran, dimethyl sulfoxide, hexamethylphosphoramide, diethylamine, triethylamine, diethylenetriamine, toluenediamine, m-phenylenediamine, diphenylmethanediamine, hexamethylenediamine, triethylenetetraamine, tetraethylenepentaamine, hexamethylenetetraamine, ethanolamine, diethanolamine, triethanolamine, and liquid amines capable of forming solvated electrons selected from the group consisting of combinations thereof.

Other substances: Pyrrolidinium, alkyl ammonium, piperidinium, imidazolium, dimethyl sulfoxide, pyridinium, imidazolium, pyrrolidinium, ammonium, phosphonium, sulphonium, 1,2-dioxolane, sulforane, methyl sulforane, 1,3-dimethyl-2-imidazolidinone, N-methyl-2-pyrrolidinone, formamide, dimethylformamide, acetonitrile, nitromethane, trimethyl phosphate, triethyl phosphate, trioctyl phosphate, phosphoric acid triesters Fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylene carbonate, trifluoromethylethylene carbonate, etc.

The aqueous electrolyte that can be used in the embodiment of the present disclosure may include at least one of the following substances, but is not limited to the following examples.

Carbonate-based series including $M_a(CO_3)_b$
hydroxide-based series including $M_a(OH)_b$
Oxide-based series including $M_aO_b$
series including halogen elements such as $M_aX_b$ (here, X includes any one of fluorine (F), chlorine (Cl), bromine (Br), iodine (I), astatin (At), and tenesin (Ts))

Other ionic substances including anions that ionically bond with metal (M) cations, where the anions include: BF4-, CN—, PF6-, AsF6-, N(CN)2-, SbF6-, AICI4-, HSO4-, CLO4-, SO4-, CF3SO3-, CF3CO2-, (C2F5SO2) (CF3SO2)N—, NO3-, A12C17-, CH3COO—, CH3SO3-, TFSi-, (CF3SO2) 3C—, (CF3CF2SO2) 2N—, (CF3SO2)2N—, (FSO2) 2N—, (CF3) 2PF4-, (CF3) 3PF3-, (CF3) 4PF2-, (CF3) 5 PF—, (CF3)6P—, SF5CF2SO3-, SF5CHFCF2SO3-, CF3CF2(CF3) 2CO—, (CF3SO2)2CH—, (SF5)3C—, (C2F5SO2) (CF3SO2)N— and (O(CF3)2C2(CF3)2O) 2PO—, etc.

Here, M refers to a metal used as a fuel in the fuel cell of the present disclosure, and may include any one of alkali metals such as lithium (Li), sodium (Na), potassium (K), rubidium (Rb), cesium (Cs), and francium (Fr), or beryllium (Be), magnesium (Mg), calcium (Ca), strontium (Sr), barium (Ba), radium (Ra), aluminum (Al), tin (Sn), manganese (Zn), copper (Cu), lead (Pb), silver (Ag), nickel (Ni), cadmium (Cd), or iron (Fe).

The separator unit may provide a movement path for metal ions, suitable for metal-air fuel cells. The separator portion may be of any material and shape that provides separation between the components, including the anode and cathode. Materials and shapes that can be used as separators include, for example, at least one of polymeric separators, membrane separators, inorganic separators, composite separators, and iontophoretic separators. This is by way of example only, and is not intended to limit the materials and forms that may be used as the separator portion. The separator portion may be integrated into the electrolyte portion as desired. The separator portion can physically separate the cathode, electrolyte, and anode portions and control the migration of only ionic forms of material.

Meanwhile, when the electrolyte unit includes an aqueous electrolyte and an organic electrolyte together, the electrolyte unit may include a separator separating the aqueous electrolyte and the organic electrolyte. In this case, the separator separating the aqueous electrolyte and the organic electrolyte may be a material having an ionic conductivity that permeates only ions of a metal used as a fuel. Examples of such separator materials include sulfide-based, oxide-based, polymer electrolytes, gel-based electrolytes, and liquid electrolytes, but are not limited thereto.

Metal-air fuel cells can provide a continuous supply of at least one metal as a metal fuel to the anode unit and a continuous supply of a gas including at least one of oxygen or carbon dioxide to the cathode unit. An ionization reaction of the metal as a metallic fuel may occur in the anode unit of the metal-air fuel cell, and an electrochemical redox reaction of oxygen and/or carbon dioxide may occur in the cathode unit. At the cathode unit, the redox reaction can produce electrical energy and carbon compounds including metal carbonates.

At this time, due to the accumulation of carbon compounds generated in the cathode unit, the performance of the cathode unit may be degraded. According to one embodiment of the present disclosure, the cathode unit or an air electrode may be replaced when the performance of the cathode unit is degraded. That is, the cathode unit or the air electrode of the present disclosure is removable and can be removed and replaced with a new electrode when certain conditions are met.

Figure 2:
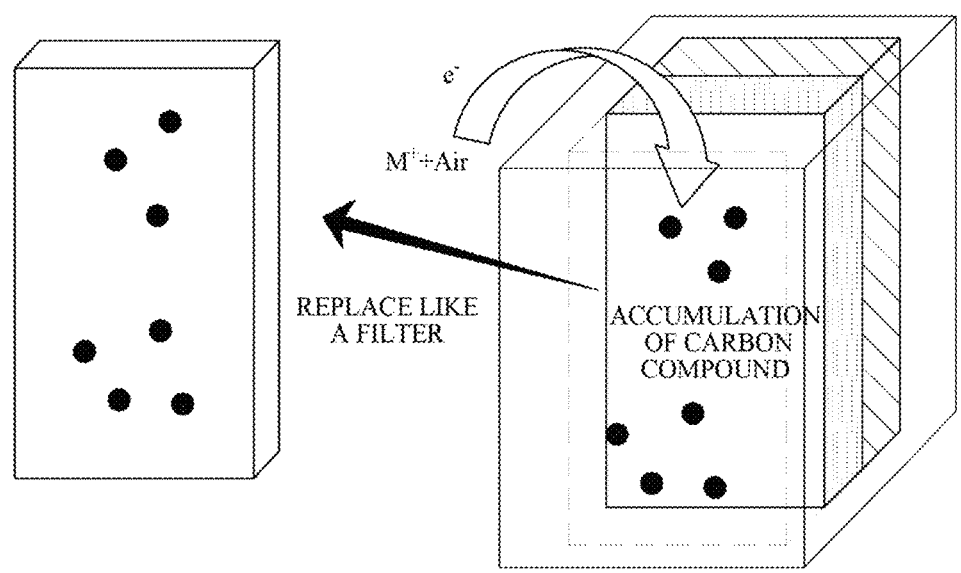
FIG. 2 is a reference diagram illustrating replacing a cathode unit having a lower performance due to accumulation of a carbon compound according to an embodiment of the present disclosure.

FIG. 2 is a reference diagram illustrating replacing a degraded cathode unit due to the accumulation of carbon compounds according to one embodiment of the present disclosure.

The metal-air fuel cell of the present disclosure can maintain or increase the performance of the metal-air fuel cell by replacing the cathode unit with a degraded air electrode, or by replacing the degraded air electrode. According to various embodiments of the present disclosure, the cathode unit or the air electrode may be integrated with the electrolyte unit and/or the separator unit and replaced together. Alternatively, each of the cathode unit, the air electrode, the electrolyte unit, or the separator unit may be configured as a modular, replaceable unit.

To accomplish this, one embodiment of the present disclosure may include a structure or device for replacing the cathode unit or the air electrode or the electrolyte unit or the separator unit, respectively, or one or more integrals thereof. In one embodiment, the replaceable cathode unit, air electrode, electrolyte unit, separator unit, and/or any of the integrals thereof may be formed in the fuel cell as a structure that is replaced in a known cartridge replacement or filter replacement manner. For this purpose, the fuel cell may be provided with a slot into which the cartridge or filter is inserted and an opening in communication with the slot.

Metals supplied as metal fuels to the anode unit may have various forms (e.g., liquids, solids, or gases). According to an embodiment of the present disclosure, the metal supplied may be supplied in a liquid or gaseous form.

In the present disclosure, the electrolyte unit that transfers metal ions from the anode unit to the cathode unit may have a structure in which liquid electrolyte is continuously supplied and circulated when a liquid electrolyte is used. According to an embodiment of the present disclosure, the electrolyte included in the electrolyte unit may be supplied continuously from the outside or may be replaced.

In an embodiment, the electrolyte unit of the present disclosure may be configured with a solid electrolyte when the operation temperature of the metal-air battery of the present disclosure is high, or may be configured with a liquid electrolyte when the operation temperature of the metal-air battery is low. In an embodiment, the electrolyte unit may be configured with a polymer electrolyte, a gel electrolyte, or the like.

The separator unit of the present disclosure may be integrated in the electrolyte unit, and for example, it may be present in the form of being provided in the electrolyte unit at the contact surface of each electrode side of the electrolyte unit. Alternatively, if a separator is not needed between the electrolyte unit and each electrode, it may be omitted.

The structure of the metal-air fuel cell described above is merely an example, and the structure of the metal-air fuel cell may be differently determined depending on the material and structure or shape of the operating temperature, operating conditions, the anode, the cathode, and the electrolyte.

Figure 3:
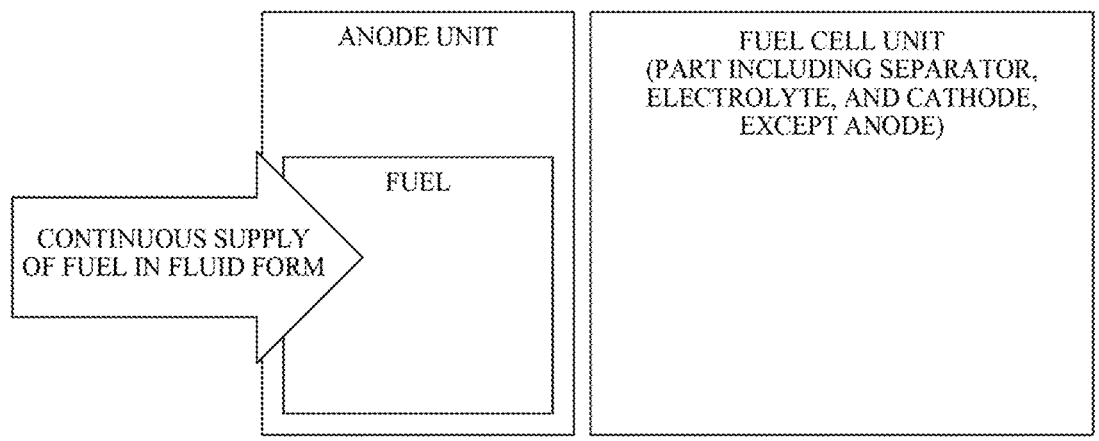
FIG. 3 is a reference diagram illustrating a method of continuously supplying metal to a fuel electrode of an anode unit in the form of a fluid of liquid or gas according to an embodiment of the present disclosure.

FIG. 3 is a reference diagram illustrating a method of continuously supplying metal to a fuel electrode of the anode unit in the form of a fluid of a liquid or a gas according to an embodiment of the present disclosure.

Referring to FIG. 3, the metal-air fuel cell of the present disclosure can continue to operate as a fuel cell by supplementing metal in a fuel electrode that is consumed during discharge process with metal in fluid form as a metallic fuel.

Figure 4:
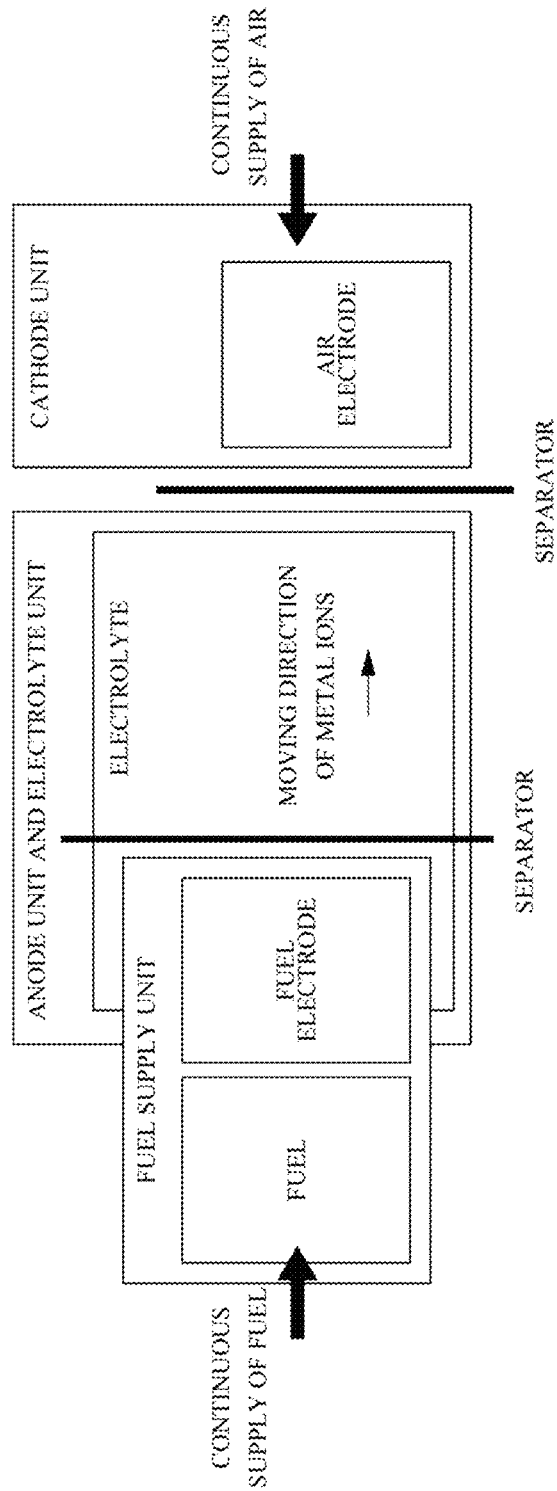
FIG. 4 is a reference diagram illustrating a structure in which an anode unit and an electrolyte unit are integrated into one module according to an embodiment of the present disclosure.

FIG. 4 is a reference diagram illustrating a structure in which the anode unit and the electrolyte unit are integrated into one module according to an embodiment of the present disclosure.

Referring to FIG. 4, the integrated module may include a metal supply unit and may continuously supply metallic fuel through the metal supply unit. In the integrated module, the metal supply unit may be physically distinguished by the electrolyte unit and the separator unit.

Meanwhile, in one embodiment of the present disclosure, the fuel cell may have a structure of a metal salt-air fuel cell that supplies metal ions in the form of metal salts such as salts instead of the direct supply of metal through the fuel electrode. Alternatively, the fuel cell may be integrated with a metal-air fuel cell according to one embodiment of the present disclosure that includes a metal fuel electrode.

Figure 5:
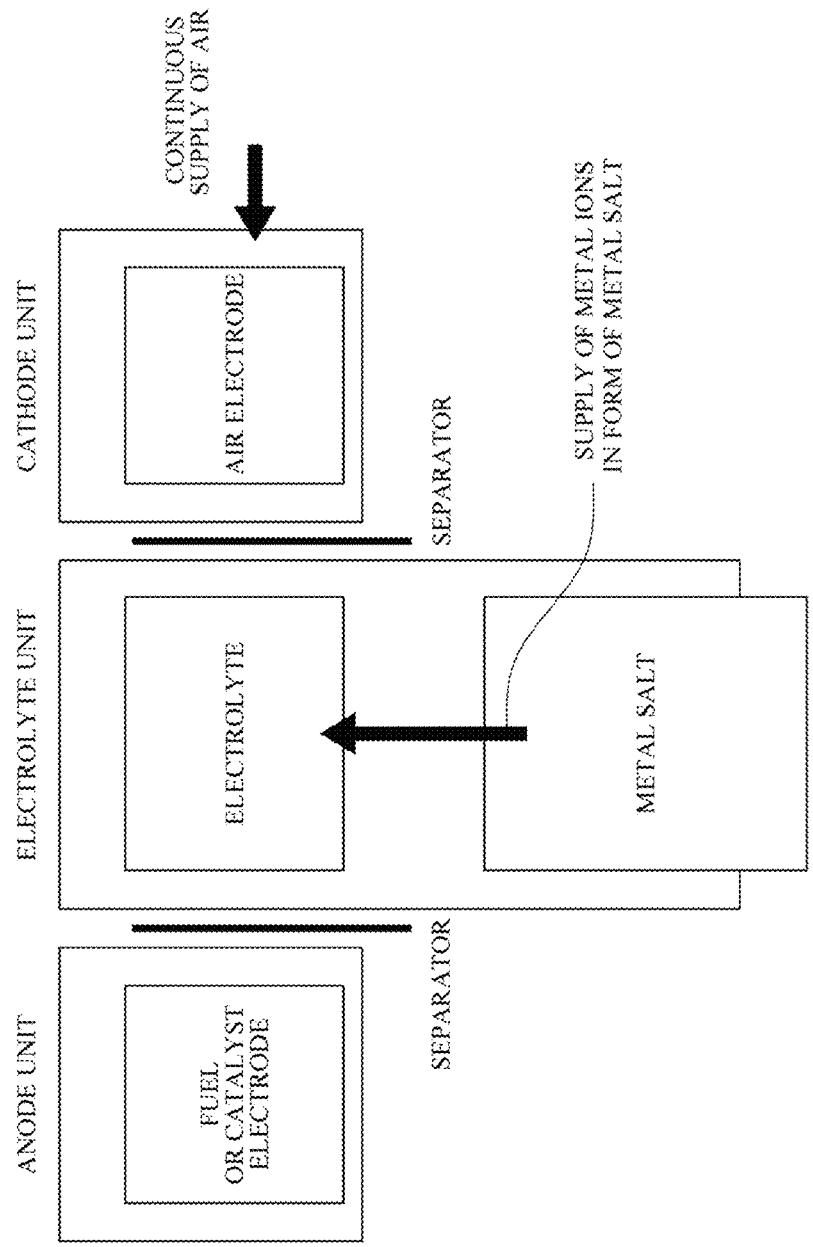
FIG. 5 is a reference diagram illustrating a metal salt-air fuel cell that supplies metal ions in the form of a metal salt according to an embodiment of the present disclosure.

FIG. 5 is a reference diagram illustrating a metal salt-air fuel cell that supplies metal ions in the form of a metal salt according to an embodiment of the present disclosure.

Referring to FIG. 5, a metal salt-air fuel cell may include an anode unit, an electrolyte unit, a cathode unit, and separators separating them.

Highly efficient electrodes such as carbon electrodes, carbon catalyst electrodes, platinum electrodes, etc. may be used as an anode in the anode unit. The anode unit may include a metal in a metal salt supplied to the electrolyte unit.

The cathode unit is provided with an air electrode, which can be continuously supplied with gas including oxygen/carbon dioxide.

The electrolyte unit may be supplied with metal ions in the form of a metal salt in the electrolyte. Here, the metal salt may be a metal salt of the same metal as a metal fuel supplied to the fuel electrode in the above-described metal-air fuel cell of the present disclosure.

The metal ions supplied in the form of metal salts in the metal salt-air fuel cell may be any substance and form with reactivity and conductivity suitable for the metal salt-air fuel cell, such as an alkali metal such as lithium (Li), sodium (Na), potassium (K), rubidium (Rb), cesium (Cs), or francium (Fr), or alkaline earth metals such as beryllium (Be), magnesium (Mg), calcium (Ca), strontium (Sr), barium (Ba), radium (Ra), or aluminum (Al), tin (Sn), manganese (Zn), copper (Cu), lead (Nb), silver (Ag), nickel (Ni), cadmium (Cd), iron (Fe), and the like may be used as metal ions, but are not limited to the metals listed. The metal salts listed above are merely exemplary and not limited thereto.

In one embodiment, the metal salt may be a metal salt by ionic bonds such as chlorides, hydroxides, carbonates, and the like. The salt used in the present disclosure may be chlorine anions, hydroxide anions, carbonate anions, and the like, but is not limited thereto.

The metal salt is supplied directly to the electrolyte unit in the form of a salt, which dissolves in the electrolyte to become a metal cation and a salt anion. In one embodiment, the electrolyte in which the metal salt is dissolved or the metal salt may be added through a flow path connected to an opening provided in the electrolyte unit. In one embodiment, a means for opening and closing the opening and/or the flow path or a means for controlling the supply amount may be provided to adjust the supply of the metal salt.

The supplied metal cation moves to the cathode unit, and a reduction reaction ($CO_2$ Reduction Reaction) and other additional reactions occur in the cathode unit, thereby generating a carbon compound such as metal carbonate ($M_a(CO_3)_b$).

The anion of the salt moves to the anode unit, losing electrons and oxidizing, and generating by-products.

Figure 6:
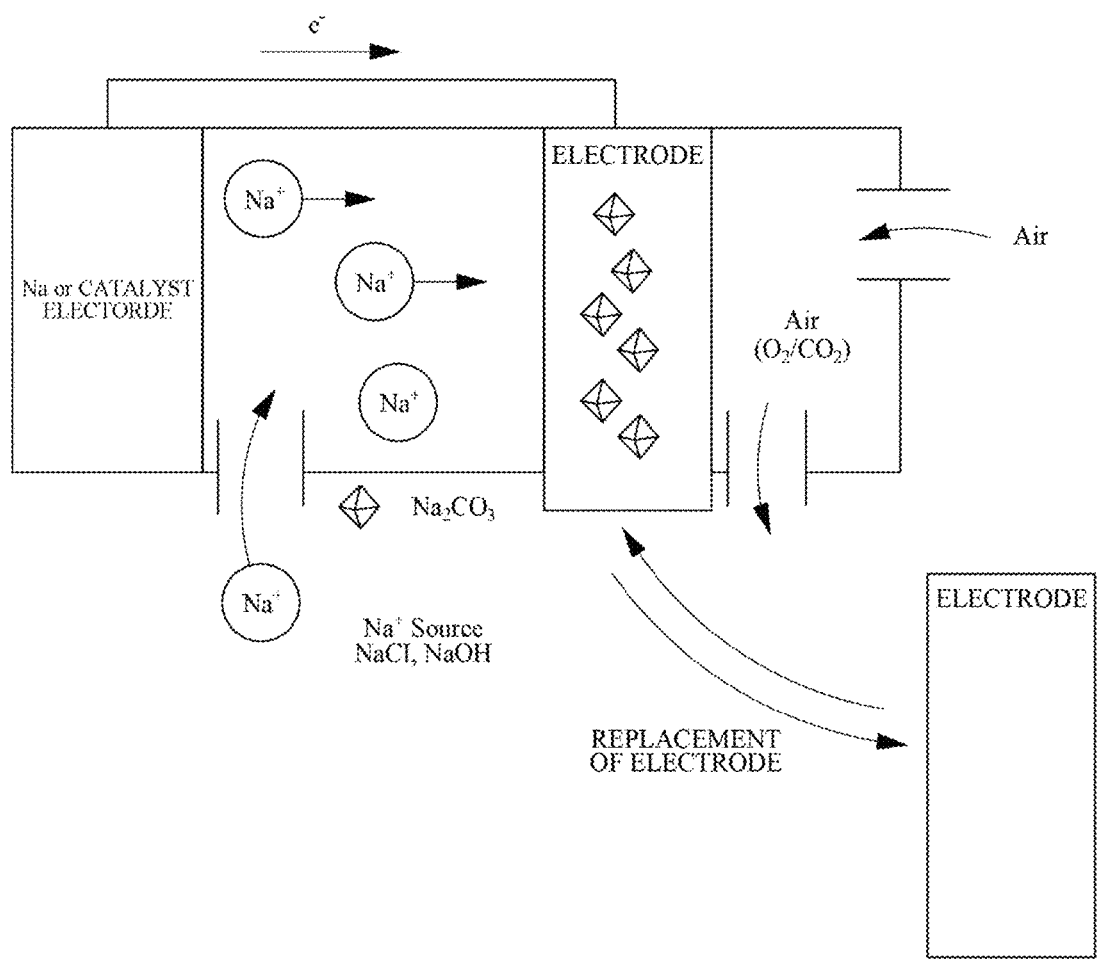
FIG. 6 is a diagram illustrating a salt-air fuel cell according to an embodiment of the present disclosure.

FIG. 6 is a diagram illustrating a salt-air fuel cell according to one embodiment of the present disclosure.

Referring to FIG. 6, the maintenance and power generation costs of fuel cells can be reduced by using metallic salts, such as salts (NaCl) that are cheaper and more abundant than metals, as supply fuels.

Referring to FIG. 6, in the air electrode, or the cathode unit, $M_a(CO_3)_b$ (e.g., $Na_2CO_3$) is generated as a by-product by the oxidation-reduction reaction described above, and carbon can be captured, and when the cell efficiency of the metal salt-air cell decreases, the electrolyte unit can be replaced or the air electrode can be replaced with a new air electrode.

Meanwhile, according to various embodiments of the present disclosure, fuel cells other than the metal-air fuel cell or metal salt-air fuel cell described above can be used to capture carbon. Since the principle of carbon capture utilized in the present disclosure is a redox reaction using a reducing agent that can react with air to reduce carbon, substances with strong reducing properties, such as alkali metals, can be used to capture carbon from air as a fuel. For example, the material supplied to the fuel electrode of the present disclosure may include an electride solution.

The electride solution is an ionic compound in which the electrons are negative ions, and can typically be prepared from a mixture of an organic solution and an alkali metal. Organic solutions used in the preparation of electride solutions can include amines, such as ammonia. Amines can also act as organic electrolytes within the metal-air fuel cells described above.

According to one embodiment, the electride solution may be generated from a combination of a metal fuel and an amine. In this case, the electride solution comprising a metal fuel and an amine can be supplied as a metal fuel in a metal-air fuel cell, or the amine can be used as an electrolyte without a separate electrolyte. For example, as shown in the example of FIG. 4, an electride solution fuel can be used as a fuel when a fuel cell with an integrated anode and electrolyte unit is utilized. In other words, an electride solution comprising a metal fuel and an amine can perform the role of a metal fuel in a metal-air fuel cell while also performing the role of an electrolyte. The electride solution comprising the metal fuel and amine can be supplied as a metal fuel through a line connected to a fuel electrode (e.g., fuel electrode 1212 in FIG. 12). Alternatively, the amines in the electride solution can act as an electrolyte, so that electrolyte can be supplied to the fuel cell without the need for a separate line connected to an electrolyte module (e.g., electrolyte module 1224 in FIG. 12). In this case, the fuel cell supply unit and the organic electrolyte unit may be integrated, or the line connected to the electrolyte module 1224 may consist of one line connected to the fuel electrode 1212. If the fuel cell supply unit and the organic electrolyte unit are integrated in one form, or if the line connected to the electrolyte module 1224 is connected to the fuel electrode 1212, which is integrated in one form, the structure within the metal-air fuel cell may be relatively simplified.

Figure 12:
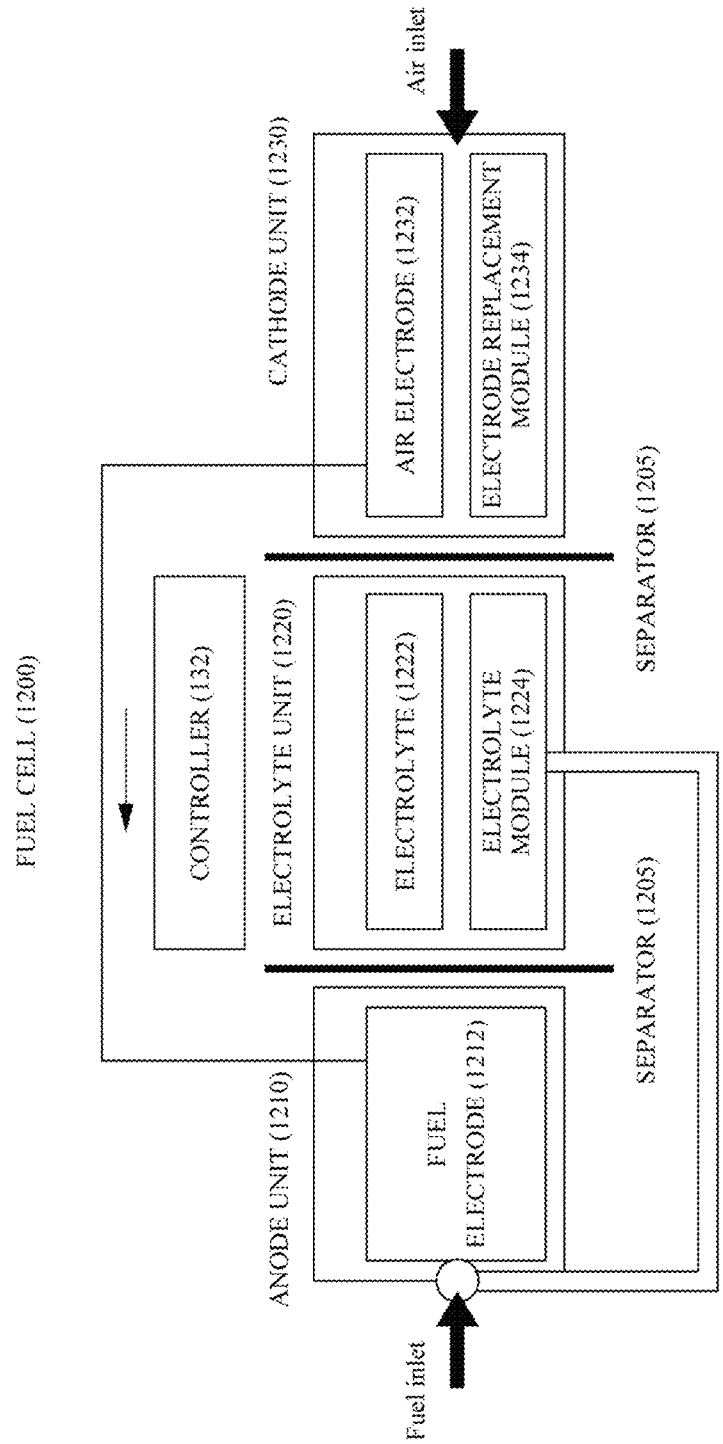
FIG. 12 is a diagram illustrating an operation in which fuel and air react to capture carbon in a carbon capture system according to an embodiment of the present disclosure.

According to another embodiment, the fuel cell may be supplied with a metal fuel as a fuel and an amine as an electrolyte. The electrolyte may comprise an organic electrolyte (e.g., amine) alone, an organic electrolyte (e.g., amine) plus an aqueous electrolyte, or a composite electrolyte. The fuel cell in this case may include a first line connected to the fuel electrode 1212 for supplying metal fuel and a separate second line connected to the electrolyte module 1224 for supplying electrolyte, as shown in FIG. 12.

An electride solution allows electrons to exist in the form of anions on the outside of the metal rather than inside. Electride solutions have the advantage of being less reactive in air than alkali metals, reducing the risk of explosions and other hazards, being a fluid and easy to utilize, and being as strongly reducible as alkali metals, they can be utilized in fuel cells to react with air to capture carbon.

In addition, the electride solution has the property of changing color from blue to transparent as reactivity decreases, which has the advantage of visibility to distinguish reactivity using color, which can make it easier to control the fuel supply.

In other words, a variety of materials other than the metals and metal salts described above may be used as fuel for the carbon capture systems of the present disclosure.

Hereinafter, specific configurations of a carbon capture system utilizing fuel cell principles and methods of operation thereof will be described in detail in accordance with various embodiments of the present disclosure.

The carbon capture system of the present disclosure may be implemented as a single device, or as a combination of individual devices or physically distinct modules. Accordingly, the terms "carbon capture system" and "carbon capture device" are used interchangeably in this disclosure.

Figure 7A:
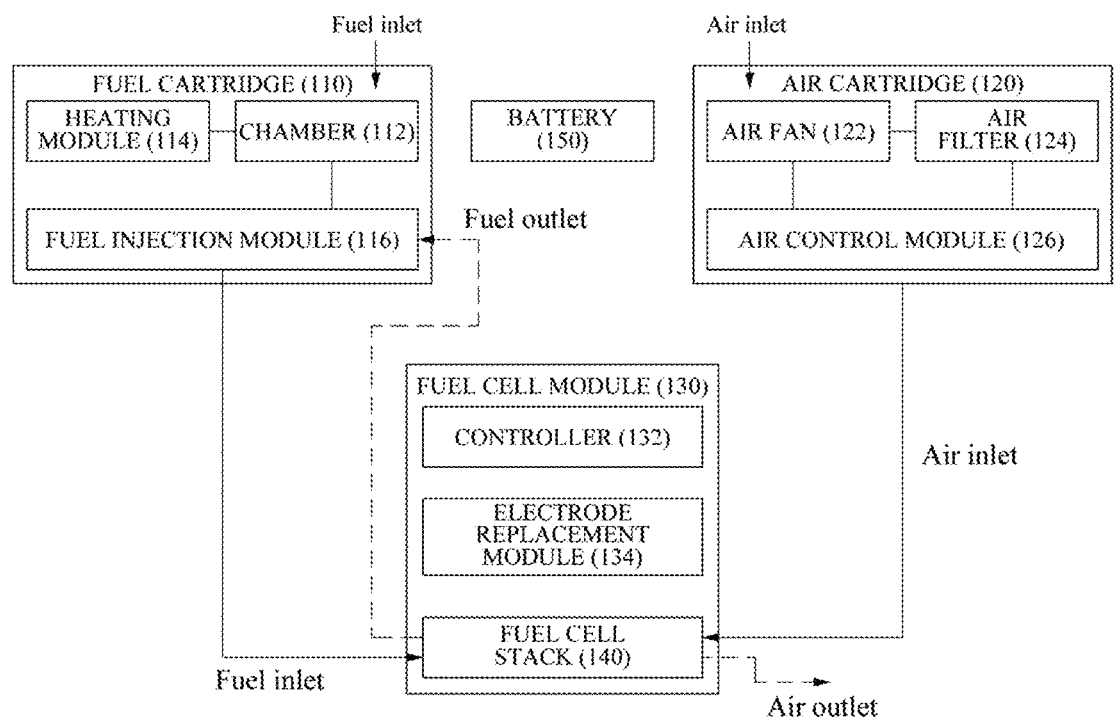
FIGS. 7A and 7B are block diagrams illustrating exemplary configurations of a carbon capture system according to an embodiment of the present disclosure.
Figure 7B:
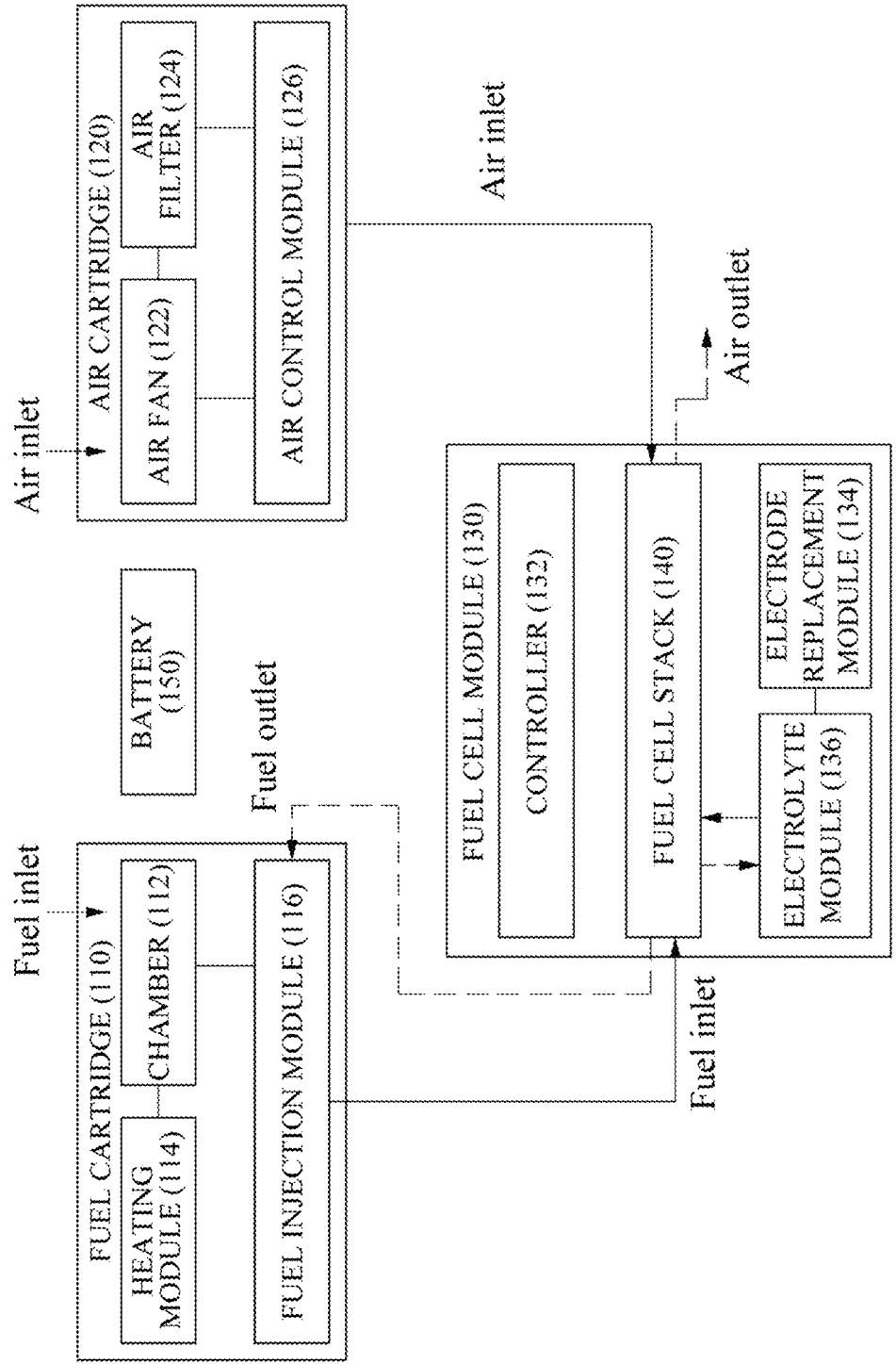

FIGS. 7A and 7B are block diagrams of an exemplary configuration of a carbon capture system according to one embodiment of the present disclosure.

The components illustrated in FIGS. 7A and 7B are exemplary, and any combination of components is possible to achieve the objectives of the present disclosure, i.e., a carbon capture system or carbon capture device according to one embodiment of the present disclosure may be implemented including all of the components illustrated, may omit some of the components, or may include additional components not illustrated.

Meanwhile, the present disclosure encompasses carbon capture devices in which each component is integrally coupled, as well as each component being implemented independently, i.e., this document includes each individual device element for constructing a carbon capture system according to one embodiment of the present disclosure.

In FIG. 7A, a carbon capture device according to one embodiment of the present disclosure may include a fuel cartridge 110, an air cartridge 120, a fuel cell module 130, and a battery 150.

The fuel cartridge 110 may include a chamber 112, a heating module 114, and a fuel injection module 116. The fuel cartridge is a module for supplying fuel to the fuel electrode (anode) of the fuel cell module (130). The fuel supplied to the fuel cartridge may comprise a metal (M), an alloy that is in a liquid state at room temperature, such as Nak, an electride solution, or a metal salt, i.e., if the fuel cell module applied to the carbon capture device of the present disclosure is a metal-air fuel cell, the fuel may be a metal, and if it is a metal-salt-air fuel cell, the fuel may be a metal salt.

The fuel supplied via the fuel cartridge may be any material and form with reactivity and conductivity suitable for a fuel cell stack, such as a metal-air fuel cell or metal salt-air fuel cell, or any other fuel cell. The fuel supplied through the fuel cartridge may be any of the metals, alloys, electride solutions, or metal salts listed in the foregoing embodiments, but is not limited to the materials exemplified in this disclosure. For example, the metal M supplied to the fuel cartridge according to one embodiment of the present disclosure may be sodium (Na). In one embodiment, the fuel cartridge 110 can be processed to introduce sodium, a metal fuel, into the fuel cell stack when sodium is used as the metal fuel.

The chamber 112 may perform functions including pre-treatment, such as introducing, storing, and/or heating fuel.

When the fuel cell module 130 includes a metal-air cell, metallic fuel as a fuel may be injected through the fuel injection module 116 in a solid state, or may be injected in a fluid state, including a liquid or gas. The injected metallic fuel may be introduced into the chamber 112 through an opening formed in the chamber 112 for storage and processing.

According to one embodiment, after the metallic fuel is introduced into the chamber 112, the chamber has a sealed environment from the outside, and the interior of the chamber may be maintained under a vacuum or low pressure. By reducing the pressure inside the chamber, highly reactive metallic fuels, such as alkali metals, can be inhibited from reacting in the chamber. Furthermore, maintaining the chamber under vacuum or low pressure after introduction of the metal fuel further lowers the melting point and vaporization point of the metal fuel, which in turn makes it easier to change and maintain the metal fuel in a liquid or gas state.

The heating module 114 can provide heat to the chamber 112 to melt the introduced metallic fuel. For example, if the metallic fuel is sodium, the heating module 114 can provide heat to maintain a temperature above the melting point of sodium (about 97.79 degrees Celsius) to cause the sodium to become liquid. This is an example only, and the temperature maintained by the heating module 114 may vary depending on the melting point of the metallic fuel being input. The heating module 114 may provide heat conventionally or may utilize an electric coil to provide heat. The heating module 114 may include a temperature sensor to detect the temperature inside the system. The heating module 114 may receive power from an external source to provide heat, or it may provide heat using internal power stored in the battery 150 from the power generation of the fuel cell. The carbon capture system of this document may utilize the heat or energy generated by the power generation of the fuel cell to change the state of the metallic fuel or to drive the carbon capture device, thereby reducing the cost of providing heat.

Meanwhile, if the fuel cell module 130 includes a metal salt-air cell, the fuel supplied to the chamber 112 may be a metal salt. According to one embodiment, the supplied metal salt may be in a liquid state. To facilitate the reaction of the metal salt, the fuel cartridge 110 may utilize a heating module 114 to supply the metal salt at a high temperature. The heating module 114 can be utilized to maintain the temperature of the metal salt stored in the chamber 112 at an optimal reaction temperature. According to another embodiment, the supplied metal salt may be in a solid state. In this case, to supply the metal salt to the fuel cell module 130 in a fluid state, it can be supplied as an electrolyte solution using a water supply for supplying a solvent such as water, or it can be supplied in a molten state using the heating module 114.

On the other hand, if the fuel supplied to the fuel cartridge is in a liquid state at room temperature, such as NaK, an electride solution, or a metal salt, the fuel supply system used in the carbon capture system of the present disclosure may be maintained and operated at low temperatures (e.g., room temperature) and thus may not require heating and cooling equipment, such as a heating module.

The fuel injection module 116 can inject metallic fuel into the fuel cell stack 140 of the fuel cell module 130. The fuel injection module 116 can inject the metallic fuel or metallic salt that has changed to a liquid or gaseous state in the chamber 112 under pressure using a compressor or pump into the fuel cell module 130. The carbon capture system of the present disclosure may utilize pressure to supply metallic fuel in a liquid or gaseous state, which may increase the reaction rate of the fuel and make the fuel injection process more convenient than when the fuel is supplied in a solid state, i.e., the fuel in a liquid or gaseous state may be more favorable to be fed through a line compared to the fuel in a solid state.

Additionally, the fuel injection module 116 can receive unburned metal fuel on the fuel cell stack 140, provide heat and feed it back to the fuel cell stack 140 to reduce the amount of unburned metal fuel that accumulates and increase the efficiency of the fuel cell. To this end, in one embodiment, the fuel injection module 116 may further retrieve fuel via a fuel outlet for retrieving metal from the fuel cell module 130. In one embodiment, metallic fuel that fails to burn or chemically react within the fuel cell stack may be returned to the fuel injection module 116 via the above outlet.

Meanwhile, in the embodiment of the present disclosure, the fuel may be introduced in a fluid state into the fuel cell module to improve reactivity and facilitate fuel supply, but other embodiments may be used. That is, the supplied metal fuel or metal salt need not necessarily be in the fluid state, and may be supplied in a solid state without separate heat treatment. When the metal fuel or metal salt is supplied in the solid state, the fuel cartridge is a cartridge including the solid fuel, and the metal fuel or metal salt may be supplied to the fuel cell module 130 in a manner of replacing the fuel cartridge when exhausted.

In one embodiment, in the above process, the fuel cartridge 120 may increase the fuel usage efficiency of the fuel cell by setting the metal fuel or metal salt fuel to be supplied in response to the amount of fuel that the fuel cell consumes per hour, thereby increasing the fuel usage efficiency of the fuel cell.

In one embodiment, the fuel utilization efficiency of the fuel cell can be increased by setting the metal fuel or metal salt fuel to be supplied in response to the amount of fuel consumed timewise by the fuel cell in the process described above.

According to one embodiment of the present disclosure, the air cartridge 120 may include an air fan 122, an air filter 124, and an air control module 126. The air cartridge is a module for supplying air to the fuel cell stack. In one embodiment, the air cartridge may collect air in the atmosphere, preprocess the collected air in a state suitable for supplying the fuel cell stack, and then supply the preprocessed air to the fuel cell stack.

The air fan 122 may perform a function of collecting air and carbon dioxide in the air into the air cartridge through rotation of the fan.

The air filter 124 may include a function to filter out debris (e.g., solid material such as dust) from the air collected via the air fan 122.

The air control module 126 can control the overall operation of the air cartridge, for example, to control the process of collecting air into the carbon capture system. The air control module 126 can measure the condition of the air (e.g., temperature, humidity, wind speed) and control the rotational speed of the air fan 122, the air compression ratio, the pressure in the carbon capture system, and the flow rate in the carbon capture system based on the measured condition of the air. Based on the condition of the air, the air control module 126 can process the collected air suitable for supplying to the fuel cell stack 140.

In one embodiment, the air cartridge 120 according to one embodiment of the present disclosure can compress, heat, or cool air to make, control, or supply air suitable for fuel cell reactions. In one example, the air control module 126 can control the air fan 122 to reduce the rotational speed of the air fan 122 and/or release air from the fuel cell stack 140 to the outside to reduce the pressure if the air pressure is measured to be high due to a relatively high flow rate of air being supplied to the fuel cell stack 140. In another example, the air control module 126 can supply a high concentration of carbon dioxide gas mixture to the fuel cell stack 140 that has been processed by accumulating carbon dioxide from the air within the air cartridge 120 to enhance carbon capture performance.

The fuel cell module 130 according to one embodiment of the present disclosure may refer to a module that utilizes a redox reaction between a fuel electrode and an air electrode to produce electrical energy and performs a carbon capture function. The fuel cell module 130 of the present disclosure may refer to an embodiment of a fuel cell, such as a metal-air cell or a metal-salt-air cell, that receives fuel from the fuel cartridge 110 and air from the air cartridge 120.

According to one embodiment of the present disclosure, the fuel cell module 130 may include a controller 132, an electrode replacement module 134, and a fuel cell stack 140.

In FIGS. 7A and 7B, the controller 132 is shown as being included in the fuel cell module 130, but the controller 132 may be included in other configurations within the carbon capture system or may exist independently.

The controller 132 may control the overall operation of the carbon capture device or carbon capture system.

According to an embodiment, the controller 132 may sense the operation situation of the fuel cell stack 140 in the carbon capture device and control at least one of temperature, internal pressure, flow rate of fuel supplied, flow rate of collected air, production amount of power produced by a fuel cell, and durability of an electrode. Specifically, the controller 132 may receive temperature information of each component of the carbon capture system and adjust the temperature by cooling or heating each component based on the temperature information. In addition, the controller 132 may receive at least one of the internal pressure of each component measured through the sensor or calculated based on the measurement information, the inflow rate, the outflow rate, the power output, or the durability of each electrode, and control the received value to be within the target range based on the received value.

According to one embodiment, the controller 132 may further include a power conversion system for converting direct current produced by the fuel cell to alternating current. Further, the controller 132 may control actions or functions performed by the fuel cartridge 110 and the air cartridge 120. More specifically, the controller 132 may control the amount of fuel supplied to the fuel cell stack 140 or the timing of the supply of the fuel. The controller 132 may control the amount of air supplied to the fuel cell stack 140 or the timing of the supply of air. The controller 132 may measure the power production efficiency of the fuel cell stack 140 to predict or determine when to replace the anode.

According to one embodiment of the present disclosure, the electrode replacement module 134 may provide the function of replacing the cathode unit (or, air electrode, or reduction electrode) of the fuel cell stack 140 to prevent loss of electrode functionality.

In the fuel cell according to an embodiment of the present disclosure, as the chemical reaction is performed, by-product carbon compounds (or carbon mineralization resources (e.g., $M_a(CO_3)_b$)) are accumulated in the cathode unit, and the electrode function may be weakened or lost.

In one embodiment, the electrode replacement module 134 may include an appliance that includes an opening, slot, or any other member or appliance for inserting or removing the cathode unit when the fuel cell stack 140 has an insertable and removable cathode unit in the form of a cartridge, to provide mechanical restraint upon insertion.

In one embodiment, the electrode replacement module 134 may include a device that imparts a force to move the cathode unit in at least one direction for insertion or removal of the cathode unit. The electrode replacement module may include, for example, an elastic member that imparts a pushing or pulling force on the cathode unit, a motor or other electronic device that generates an electromagnetic force, or an electromagnet or magnetic member that is removable by external control. Alternatively, the electrode replacement module may include a configuration corresponding to a handle on the cathode unit, which may have the effect of making it easier for a user to remove the cathode unit.

The electrode replacement module 134 according to an embodiment measures the degree to which byproducts are accumulated in the cathode and the constituting components in the fuel cell stack 140, and may automatically replace the cathode unit if the amount of accumulated byproducts exceeds a specified level. Alternatively, the electrode replacement module 134 may transmit information indicating that the cathode should be replaced if the amount of accumulated by-product exceeds a specified level to the controller 132. The controller 132 may receive information from the electrode replacement module 134 indicating that the cathode should be replaced and display it to the user.

The fuel cell stack 140 according to an embodiment of the present disclosure can generate a chemical reaction using the fuel supplied from the fuel cartridge 110 and the air supplied from the air cartridge 120 and produce electrical energy. That is, the fuel cell stack 140 according to the embodiment of the present disclosure may mean the air fuel cell of the present disclosure.

The fuel cell stack 140, according to one embodiment of the present disclosure, may include a separator plate, a gas diffusion layer, fuel electrodes, an electrolyte unit, and air electrodes. A detailed configuration of the fuel cell stack 140 will be described with reference to FIGS. 8, 9A, and 9B.

According to one embodiment, the battery 150 may function to store power generated through chemical reactions in the fuel cell module 130.

The controller 132 may store power generated by the fuel cell module 130 in the battery 150, or may supply power stored in the battery to an internal part of the carbon capture system (e.g., the fuel cartridge 110, the air cartridge 120). For example, the controller 132 can supply power stored in the battery 150 to the fuel cartridge 110, and the heating module 114 in the fuel cartridge 110 can utilize the power supplied by the battery to change the state of the injected fuel to a gas or liquid.

According to one embodiment, the battery 150 of the present disclosure may be detachable from the carbon capture device. Once charged, the battery 150 may be detached and used to provide power for other electronic devices.

Additionally, a discharged or uncharged battery may be coupled to the carbon capture device of the present disclosure and recharged by electrical energy generated from the fuel cell module 130. Alternatively, any electronic device that is activated with electric energy may be connected instead of the battery 150 to receive power from the device of this disclosure.

That is, the battery 150 of the present disclosure may include any electronic device or power storage device that receives power generated by the carbon capture device.

The carbon capture system of the present disclosure can transmit electrical energy generated by the fuel cell module 130 to an external system. In this case, the electrical energy can be provided externally in the form of a direct connection and transmission to the external system, or power stored in the battery 150 can be transmitted to the external system.

FIG. 7B illustrates a structure in which the fuel cell module 130 further includes an electrolyte module 136. The electrolyte module 136 may function to manage electrolyte supplied to the electrolyte unit within the fuel cell stack 140.

In an embodiment, the electrolyte module 136 may pressurize the liquid-state electrolyte to the electrolyte unit of the fuel cell stack 140 using an injection device such as a compressor, a pump, and supply it through an electrolyte inlet of the fuel cell stack 140. At this time, the pressure, flow rate, temperature, and supply amount of electrolyte supply may be controlled by the electrolyte module 136. In an embodiment, the electrolyte module 136 may recover the liquid-state electrolyte from the electrolyte unit of the fuel cell stack through an electrolyte outlet. In the present disclosure, the electrolyte of the electrolyte unit of the fuel cell stack may be maintained and managed by supplying and/or replacing the electrolyte of the electrolyte unit of the fuel cell stack using the electrolyte module 136. In an embodiment, when the fuel cell module 130 includes a metal salt-air battery, the electrolyte module 136 may control the supply pressure, flow rate, temperature, and supply amount of the metal salt.

The carbon capture systems and methods described herein can also be applied to conventional fuel cell stacks and systems, where the fuel cell is configured in the form of a solid oxide fuel cell (SOFC) or a molten carbonate fuel cell (MCFC), as only the state of the supplied fuel is changed to a liquid or gas.

The carbon capture systems and methods of this document use the same fuel cell stack and system as conventional fuels (e.g., hydrogen, city gas, LNG, biomass), but can use metallic fuels (e.g., alkali metals) that are relatively more reactive compared to conventional fuels to increase the reaction of the fuel with air. The carbon capture systems and methods can reduce costs by eliminating the use of relatively expensive materials (e.g., precious metals) that have been used to increase chemical reactivity at the air electrode due to the high reactivity of the metallic fuel. The carbon capture systems and methods of this document can reduce the cost of carbon capture while lowering the manufacturing cost of fuel cells through cost savings. In addition, the use of a fuel in a liquid or gaseous state can eliminate or simplify processes to improve the reactivity of the fuel with the electrode, as the relatively large surface area of the fuel compared to the solid state allows for relatively good reactions to occur.

According to one embodiment, when the fuel cell is configured in the form of a high temperature form of fuel cell (e.g., molten carbonate fuel cell (MCFC), solid oxide fuel cell (SOFC)), ions (e.g., $CO_3^{2-}$ ions) generated at the air electrode may migrate through the electrolyte to the fuel electrode. Ionized metals (e.g., sodium ions) located on the fuel electrode and ions (e.g., $CO_3^{2-}$ ions) generated from the air electrode can undergo a chemical reaction to produce a carbon compound (e.g., $Na_2CO_3$). The interior of a high-temperature form of fuel cell (e.g., a molten carbonate fuel cell (MCFC)) can be operated at a specified temperature (e.g., 600 degrees Celsius) or higher to maintain the carbon compound produced in a liquid or gaseous state. The carbon capture system can discharge the carbon compounds in the liquid or gaseous state to the outside via a fueling line connected to the fueling module 116. The carbon capture system may utilize the fueling line created for fueling to vent the carbon compounds to the outside, reducing complexity and cost by not utilizing additional configurations (e.g., vent lines). In addition, the carbon capture systems and methods described herein can accumulate carbon compounds that are vented to the outside for sale or other uses.

Meanwhile, when the fuel according to an embodiment of the present disclosure uses an alloy metal that is liquid at room temperature, such as Nak, the carbon capture system of the present disclosure may be applied in combination with an SOFC fuel cell system or a PEMFC system having a low operating temperature.

Figure 8:
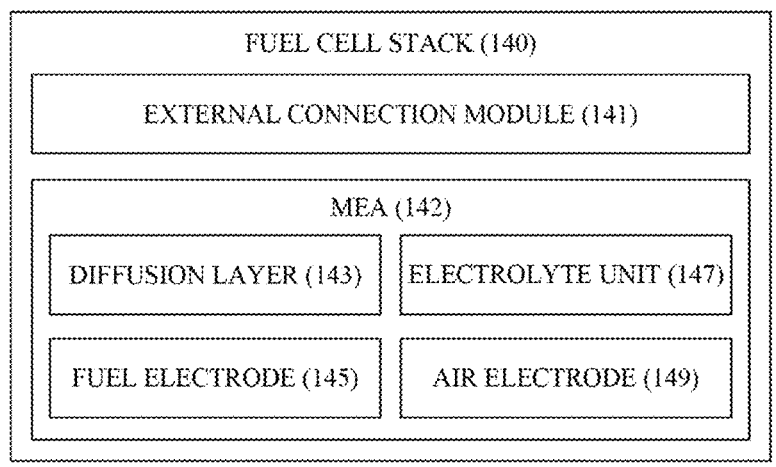
FIG. 8 is a block diagram illustrating a configuration of a fuel cell stack according to an embodiment of the present disclosure.

FIG. 8 is a block diagram of a configuration of a fuel cell stack according to one embodiment of the present disclosure. The block diagram illustrated in FIG. 8 is a modularized representation of each of the components comprising the fuel cell stack for ease of description and is not intended to be a representation of the actual structure.

According to FIG. 8, the fuel cell stack 140 may include an external connection module 141, a diffusion layer 143, a fuel electrode 145, an electrolyte portion 147, and an air electrode 149.

The external connection module 141 of the present disclosure may perform a function of separating the fuel cell stack and external components thereof. In addition, the external connection module 141 may perform a function of a separator that separates the fuel cell stack. Herein, the term external connection module 141 is an arbitrary term, and the external connection module 141 in the present disclosure refers to a module that performs a function of separating the internal structure of the fuel cell stack that perform fuel cell functions and other components, such as a separation module, separation plate, boundary, or interface.

Meanwhile, the external connection module 141 may be created as a curved line to serve as a passage through which fuel and air are supplied. That is, the fuel cell stack 140 may be connected to the fuel cartridge and the air cartridge through the external connection module 141 to receive fuel and air. The external connection module 141 may include each opening as an inlet and an outlet of the metal fuel and the air (or gas) and a flow path communicated therewith. Here, the flow path may have a shape suitable for diffusion of the metal fuel and the air through the diffusion layer 143 as needed. For example, referring to FIGS. 9A and 9B, the external connection module 141 may have a curved shape to secure a contact area of the flow path with the diffusion layer 143.

The diffusion layer 143 may diffuse fuel and air supplied through the lines of the external connection module 141. The diffusion layer 143 may be constructed of any material and matrix suitable for diffusing fuel and air. The diffusion layer 143 may be omitted as desired within the carbon capture system, may be incorporated into other components, or may be arranged differently than the arrangement in FIGS. 9A and 9B.

The fuel electrode 145 can include an electrode at which the fuel supplied from the fuel cartridge 110 (e.g., a reducing agent, e.g., an alkali metal, a metal salt, or an electride solution) is oxidized. The fuel electrode 145 may comprise a carbon-based material (e.g., graphite, carbon paper, carbon black). Carbon-based materials may have relatively good electrical conductivity and chemical resistance compared to other materials, which may make them suitable for generating power or causing chemical reactions.

The electrolyte unit 147 can move ions (e.g., metal ions) produced after a chemical reaction between fuel and air. The electrolyte included in the electrolyte unit 147 can include at least one of a liquid electrolyte, a solid electrolyte, a gel-state electrolyte, a water-soluble electrolyte, an organic electrolyte, or a composite electrolyte.

When the electrolyte unit 147 according to one embodiment of the present disclosure includes a composite electrolyte, the electrolyte unit 147 may include a first electrolyte located toward the fuel electrode 145 and a second electrolyte located toward the air electrode 149, and may include a separator separating the first and second electrolytes. In this case, the first electrolyte may include an organic electrolyte and the second electrolyte may include an aqueous electrolyte. A more detailed description of the structure of which the electrolyte unit 147 is configured as a hybrid will be described later with reference to FIG. 9B.

When the fuel cell applied to the carbon capture system of the present disclosure has the form of a SOFC, the electrolyte unit 147 may use a highly ionic solid oxide (e.g., a ceramic material) such as NASICON (Sodium [Na] Super Ionic CONductors) or beta alumina.

When the fuel cell applied to the carbon capture system of the present disclosure is in the form of an MCFC, the electrolyte unit 147 may directly utilize a liquid state metal compound (e.g., $M_a(CO_3)_b$, such as $Na_2CO_3$). The fuel cartridge 110 can utilize the heating module 114 to heat the solid state metal compound to provide the liquid state metal compound to the fuel cell stack 140, and the liquid state metal compound can act as an electrolyte. The electrolyte unit 147 can move the liquid metal compound. Since the amount of metal compound may change within the fuel cell stack, to maintain a constant level of electrolyte, the fuel cell stack 140 may use lines and/or devices attached to the external connection module 141 to receive or remove the liquid state metal compound.

The air electrode 149 can reduce air supplied through the air cartridge 120. The air electrode 149 may be made of, for example, platinum (Pt) or carbon (C), or may be made of a material based on carbon or graphite but containing additional nickel (Ni). In an air electrode, oxygen or carbon dioxide in the air supplied via an air cartridge can react with metal ions (e.g., sodium ions) to produce a byproduct (e.g., $Na_2CO_3$). The byproduct of the reaction of the oxygen or carbon dioxide in the air with the metal ions can be deposited on the air electrode 149. If the byproduct accumulates on the air electrode 149 beyond a specified level, it may become less electrically conductive, making it difficult to function as an electrode. As a result, when by-products are accumulated, it may be necessary to replace the air electrode 149. The fuel cell stack 140 may further include components for replacing the air electrode 149. The air electrode may be replaceable if the carbon compounds is accumulated in a solid form, and it may include a flow path for removing them if they form in a liquid or gaseous fluid state. In this case, the flow path through which the liquid or gaseous carbon compounds can be vented to the outside may be formed separately, or an existing fuel supply line connected to the fuel cell stack 140 may be used. The fuel cell stack 140 may prevent metal oxides from accumulating, thereby increasing the replacement cycle of the electrodes, including the air electrode 149, and reducing the costs associated with replacing the electrodes.

According to one embodiment, the diffusion layer 143, fuel electrode 145, electrolyte portion 147, and air electrode 149 may be present in an integrated form of a membrane electrode assembly (MEA) 142.

Figure 9A:
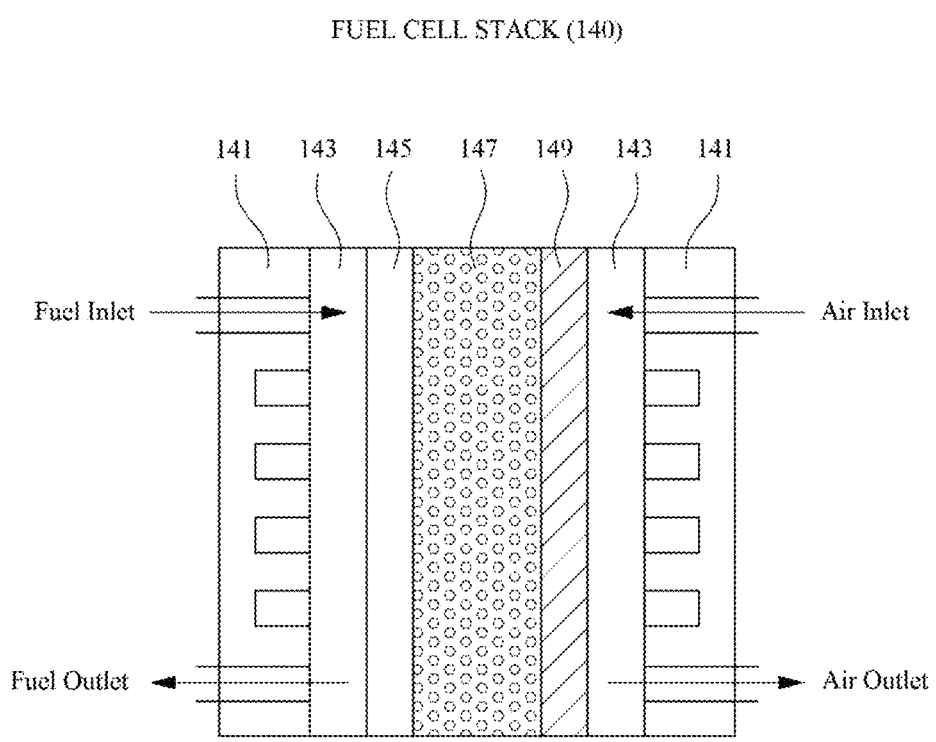
FIGS. 9A and 9B are diagrams illustrating a structure of a fuel cell stack 140 according to an embodiment of the present disclosure.

FIG. 9A is a diagram illustrating the structure of a fuel cell stack 140, according to one embodiment of the present disclosure.

The fuel cell stack of FIG. 9A is an exemplary structure of the fuel cell stack disclosed in FIG. 8.

In FIG. 9A, the fuel cell stack 140 may receive fuel from the fuel cartridge 110 and air from the air cartridge 120.

The fuel cell stack 140 may be supplied with fuel. The fuel may be supplied to the fuel cell stack 140 via the fuel injection module 116. The fuel cell stack 140 may be supplied with fuel in a liquid or gaseous state using a line, which may be easier to fuel compared to fuel in a solid state. Additionally, the fuel cell stack 140 can be supplied with fuel in a liquid or gaseous state, and any remaining fuel that is not burned or reacted can be removed using a line connected to an opening in the external connection module 141 or a separate line. Fuel in a liquid or gaseous state may be relatively more reactive compared to fuel in a solid state, so that the amount of remaining fuel may be relatively less, and because it flows in the form of a fluid, the amount that accumulates on the air electrode 149 may be relatively less.

Additionally, the fuel cell stack 140 may receive air from the air cartridge 120. The air control module 126 may measure the condition of the air (e.g., temperature, humidity, air velocity) and control the rotational speed of the air fan 122, the air compression ratio, the pressure in the carbon capture system, and the flow rate in the carbon capture system based on the measured condition of the air. The fuel cell stack 140 may react with the fuel and vent the remaining air to the outside, or may vent the air to the outside if the internal hydraulic pressure exceeds a specified level.

Meanwhile, an oxidation reaction of fuel such as metal takes place at the fuel electrode 145, and the resulting cations can move through the electrolyte unit 147 to the air electrode 149, which is the cathode. At the air electrode, carbon from the air can be captured through a reduction reaction in the air. The captured carbon may accumulate on the air electrode in the form of carbon compounds, and when the amount of carbon compounds accumulated on the air electrode exceeds a certain level, the air electrode may be replaced using the electrode replacement module included in the fuel cell module 130.

Figure 9B:
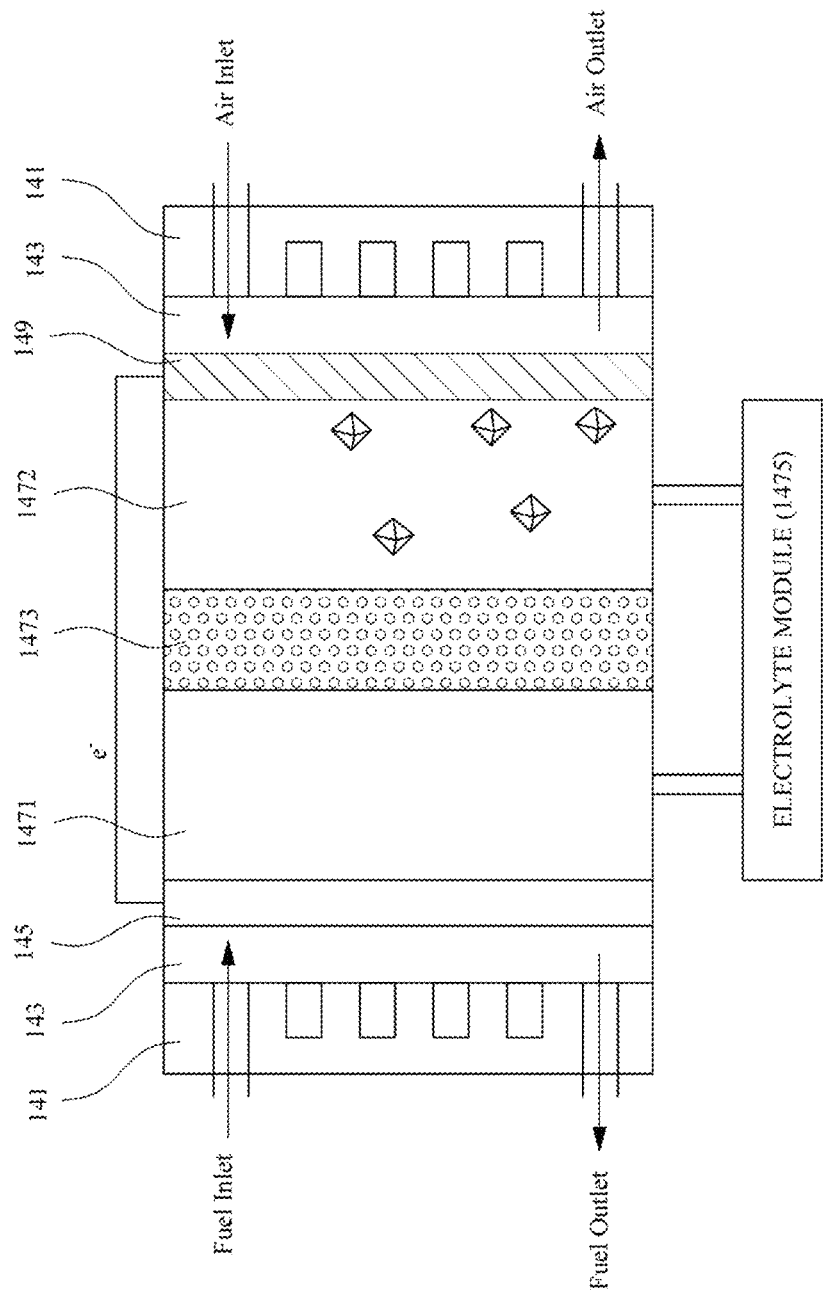

FIG. 9B is a diagram illustrating a structure of a hybrid fuel cell stack according to one embodiment of the present disclosure.

Referring to FIG. 9B, the electrolyte unit of the hybrid fuel cell stack may include a mixed electrolyte and may include a first electrolyte portion 1471, a second electrolyte portion 1472, and a separator 1473 therebetween. It can further include an electrolyte module 1475 for adjusting the concentration or amount of electrolyte contained in each electrolyte portion. In this example, the first electrolyte portion 1471 closer to the fuel electrode 145 may include an organic-based electrolyte, and the second electrolyte portion 1472 closer to the air electrode 149 may include an aqueous-based electrolyte. The separator may comprise a permeable material that allows only cations to pass through. As the reaction proceeds, electrolytes may be exchanged through the electrolyte module 1475 to maintain the concentration of electrolytes contained in each of the first electrolyte portion 1471 and the second electrolyte portion 1472. The electrolyte module 1475 and the respective electrolyte portions may be connected via different tubes.

Meanwhile, carbon compounds captured by the redox reaction of the fuel cell may be precipitated in the second electrolyte portion, so that the performance of the cell can be maintained by replacing only the second electrolyte portion 1472 instead of replacing the relatively expensive air electrode 149. As a module, the second electrolyte portion can be replaced by itself or by replacing only the solution contained in the second electrolyte portion. That is, by replacing only the electrolyte aqueous solution, the performance of the cell can be maintained and the captured carbon compounds can be easily separated by filtering the electrolyte aqueous solution.

Figure 10:
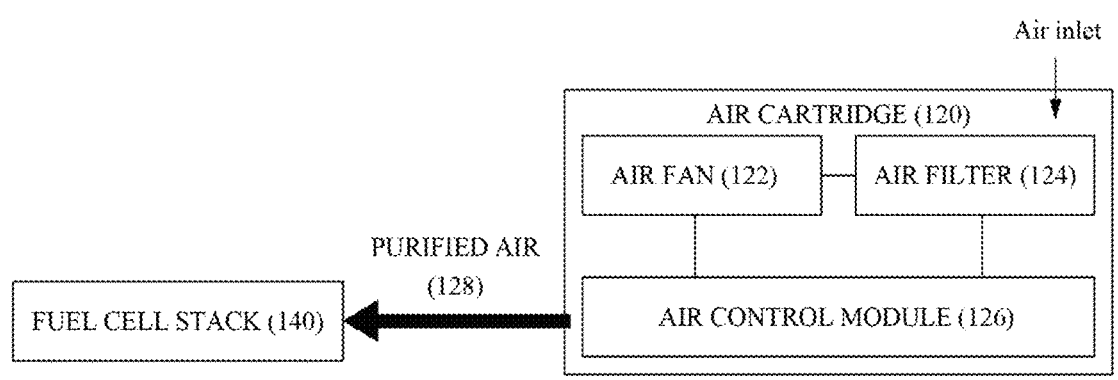
FIG. 10 is a diagram illustrating a configuration for capturing air using an air cartridge in a carbon capture system according to an embodiment of the present disclosure.

FIG. 10 illustrates a configuration for capturing air with an air cartridge in a carbon capture system, according to one embodiment of the present disclosure.

In FIG. 10, the air cartridge 120 may include an air fan 122, an air filter 124, and an air control module 126. As described above, the air fan 122 may rotate to collect air and carbon dioxide in the air into the carbon capture system. The air filter 124 may be used to filter out debris, such as solid material (e.g., dust), from the air collected via the air fan 122. Air control module 126 may control the process of collecting air into the carbon capture system. The air control module 126 can measure the condition of the air (e.g., temperature, humidity, wind speed) and control the rotational speed of the air fan 122, the air compression ratio, the pressure in the carbon capture system, and the flow rate in the carbon capture system based on the measured condition of the air. Based on the condition of the air, the air control module 126 can make the collected air suitable for supplying to the fuel cell stack 140.

According to one embodiment, air filter 124 can purify outside air by removing impurities (e.g., dust) in the air. The air 128 purified by the air filter 124 can be injected into the air electrodes 149 of the fuel cell stack 140 via the air control module 126. Air filter 124 may utilize any one or a combination of two or more of a particular technology (e.g., pressure swing adsorption (PSA), thermal swing adsorption (TSA), pressure thermal swing adsorption (PTSA), vacuum swing adsorption (VSA)) for air purification. PSA can refer to a technique that works on the principle that at high partial pressures, certain gases are preferentially adsorbed or captured by the adsorbent material, and when the partial pressure is reduced below a specified level, the gas is desorbed or released. TSA may refer to a technology that operates on the principle that certain gases are preferentially adsorbed or captured by the adsorbent material at room temperature, and that certain gases are desorbed or released when the temperature exceeds a specified level. PTSA may refer to a technology that combines PSA and TSA. VSA can mean a technology that utilizes the principle that certain gases are preferentially adsorbed or captured by an adsorbent material at around atmospheric pressure, and certain gases are desorbed or released under vacuum.

The air filter 124 may further comprise a chargeable adsorbent material or optionally a permeable membrane that is permeable to substances. The adsorbent material may include, for example, at least one of zeolite, alumina, silica gel, metal-organic framework (MOF), zeolitic imidazolate framework (ZIF), activated carbon, or a mixture of two or more of these. MOF may refer to a crystalline compound comprising metal ions or metal clusters coordinated to an organic molecule, forming a porous primary, secondary, or tertiary structure. ZIF may refer to a nanoporous compound consisting of tetrahedral clusters linked by imidazolate ligands. These are just examples, but the type of adsorbent material can be any material capable of adsorbing impurities. The permeable membrane can be disposed in parallel to the direction of flow of the external air.

The air control module 126 can also accumulate carbon dioxide from the air to generate a high concentration of carbon dioxide mixed gas to enhance carbon capture performance.

Figure 11:
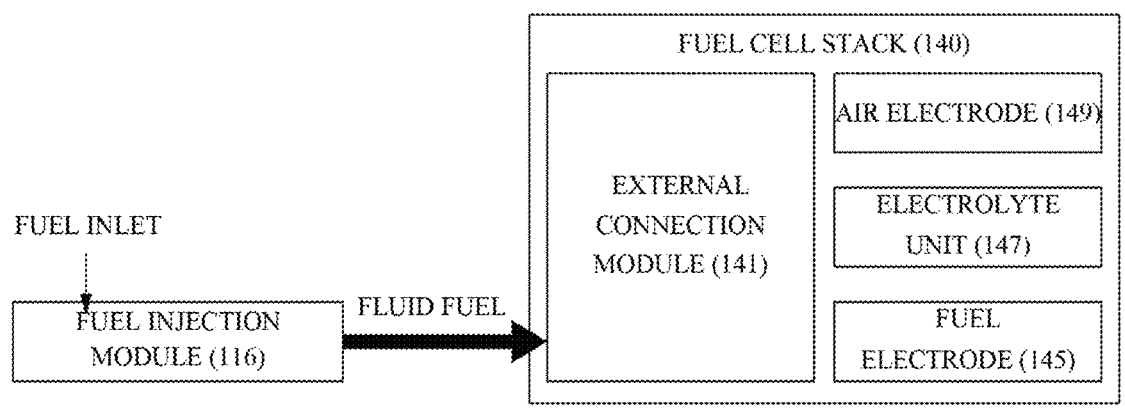
FIG. 11 is a diagram illustrating a configuration for supplying fuel from a fuel cartridge to a fuel cell stack in a carbon capture system according to an embodiment of the present disclosure.

FIG. 11 illustrates a configuration for supplying fuel from a fuel cartridge to a fuel cell stack in a carbon capture system, according to one embodiment of the present disclosure.

In FIG. 11, the fuel cell stack 140 may include an external connection module 141, a fuel electrode 145, an electrolyte unit 147, and an air electrode 149. The function of each of the depicted components is as described above.

In FIG. 11, the fuel injection module 116 can supply fuel in a liquid or gaseous state made in a chamber (e.g., chamber 112 in FIG. 7A) to the fuel electrode 145. The fuel supplied may include any one of a metal fuel (e.g., Na), a metal salt fuel (e.g., NaCl), a liquid mixed metal (e.g., NaK), and an electride solution. The fuel electrode 145 may be supplied with fuel in a fluid state from the fuel injection module 116. Fluid fuels may be more efficient in terms of reactivity and energy conversion efficiency because they have a relatively large surface area compared to solid-state fuels. In addition, fluid fuels may be mechanically or structurally easier to obtain a fuel supply line or to inject into the fuel electrode 145 compared to solid-state fuels. Because solid-state fuels have a fixed shape, they can be difficult to inject into the fuel electrode 145 if they have a larger cross-sectional area than the fuel supply line. On the other hand, fluid fuels can be injected into the fuel electrode 145 relatively easily using gravity or by utilizing a configuration that can apply pressure (e.g., a motor, compressor) because the shape of the metal can change depending on the shape of the fuel supply line.

Additionally, because the fluid fuel requires a relatively high temperature on the fuel cell stack 140 to remain in a fluid state, it can be more reactive, which can result in a relatively higher efficiency of the fuel cell compared to solid metal. At this time, energy generated by the fuel cell module of the carbon capture system of the present disclosure may be used as the energy to maintain the internal temperature high.

FIG. 12 is a diagram to illustrate the operation of fuel and air reacting to capture carbon within a carbon capture system according to one embodiment of the present disclosure.

Referring to FIG. 12, the fuel cell system 1200 may include an anode unit 1210, an electrolyte unit 1220, and a cathode unit 1230.

The anode unit 1210 can include a fuel electrode 1212 (or anode). The anode unit 1210 may be injected with fuel in a liquid or gaseous state via a fuel injection module. The fuel injected into the anode unit may include any of the following: metal fuel (e.g., Na), metal salt fuel (e.g., NaCl), liquid mixed metal (e.g., NaK), or electride solution.

The electrolyte unit 1220 can move ions (e.g., metal ions) generated after a chemical reaction at the fuel electrode. The electrolyte unit 1220 can include an electrolyte 1222 for moving the ions. The electrolyte unit 1220 may comprise a plurality of electrolyte portions, in which case a separator may be included to separate each electrolyte portion.

The cathode unit 1230 may include an air electrode 1232 (or a cathode). The cathode unit 1230 may receive purified air or a processed gas mixture from an air cartridge or the like.

A separator 1205 may be positioned between the anode unit 1210 and the electrolyte unit 1220. Additionally, another separator 1205 may be positioned between the electrolyte unit 1220 and the cathode unit 1230. The separator 1205 can physically separate the anode unit 1210, the electrolyte unit 1220, and the cathode unit 1230, and can be controlled to allow only substances in ionic form to move.

The anode unit 1210 and the electrolyte unit 1220 may be physically connected by supply lines for fuel injection and electrolyte injection. The fuel cell 1200 may include a first line connected to the fuel electrode 1212 for fuel supply. In addition, the fuel cell 1200 may include a second line connected with the electrolyte module 1224 for supplying electrolyte. The first line and the second line may be connected together as a supply line, or may be formed separately. The first line and the second line may be connected together if an electride solution generated from a combination of a metal fuel and an amine is supplied as the metal fuel and electrolyte, as described above in relation to the electride solution.

An electride solution comprising a metal fuel and an amine can be supplied as a metal fuel in a metal-air fuel cell, and an amine can be used to act as an electrolyte without the need for a separate electrolyte. In other words, an electride solution comprising a metal fuel and an amine can act as a metal fuel in a metal-air fuel cell while also acting as an electrolyte. The electride solution, which is a combination of a metal fuel and an amine, can be supplied as a metal fuel through a line connected to the fuel electrode 1212. Because the amine in the electride solution acts as an electrolyte, electrolyte can be supplied to the fuel cell without the need for a separate line connected to the electrolyte module 1224. In this case, the fuel cell supply and the organic electrolyte portion may be in one form, or the line connected to the electrolyte module 1224 may consist of one line connected to the fuel electrode 1212. If the fuel cell supply and the organic electrolyte portion are in one form, or if the line connected to the electrolyte module 1224 is in one form and the line connected to the fuel electrode 1212 is in one form, the structure within the metal-air fuel cell may be relatively simplified.

Fuel electrode 1212 and air electrode 1232 may be composed of any material (e.g., graphite, metal-carbon composites, monomaterials and composites, silicon-based catalyst composites, catalyst electrodes, semiconducting material electrodes, polymer electrodes, nanomaterial electrodes, metal mesh-shaped electrodes, organic/inorganic composite material electrodes, liquid-shaped electrodes, transition metal dichalcogenides (TMD) electrodes, graphene electrodes, carbon nanotube (CNT) electrodes). While this is an example, the materials that can be used as fuel electrode 1212 and air electrode 1232 are not limited to these, and can include any material with reactivity, conductivity, or semiconductivity suitable for the reaction of air and metal fuel.

According to one embodiment, an oxidation reaction may occur at fuel electrode 1212. At fuel electrode 1212, the oxidation reaction may ionize metal components contained in the fuel. The ionized metal can move through the electrolyte unit 1220 and the separator 1205 to the air electrode 1232. Alternatively, ionized metal already contained in the electrolyte unit 1220 may migrate to the air electrode 1232. Meanwhile, electrons generated by the oxidation reaction at the anode may move from the anode unit 1210 to the cathode unit 1230 through a separate circuit (wire), where the direction of the current may be opposite to the movement of the electrons.

According to one embodiment, a reduction reaction in air can occur at air electrode 1232. At air electrode 1232, oxidation of metal ions can occur with reduction of oxygen. At air electrode 1232, a carbon compound may be generated through a chain of chemical reactions. The resulting carbon compounds may include $M_a(CO_3)_b$, CO, COOH, and the like. Through these reactions, it can be seen that carbon (C)

atoms present in the air are captured in the form of carbon compounds (e.g., $Na_2CO_3$) bonded to metals.

The carbon capture system in the document can remove carbon from the air by capturing carbon dioxide present in the air in the form of carbonate or the like through the above chemical reaction.

The carbon capture systems in this document can remove carbon from the air by introducing a metallic fuel (e.g., sodium). For example, if the carbon compound is $Na_2CO_3$, two metal ions can be used to remove one molecule of carbon dioxide from the air. Sodium chloride makes up 30.6% of the ions present in seawater (ocean water), which covers 70% of the Earth's surface area, so it can be obtained at low cost without fear of depletion. When using sodium chloride (NaCl) as a metallic fuel, a carbon capture system can remove a specified level of carbon (e.g., 1 ton) from the air by injecting a specified level of sodium chloride (e.g., 12 tons).

In addition, the carbon capture systems described herein may utilize or sell the captured carbon compounds industrially. A carbon capture system can capture oxygen or carbon dioxide from the air to generate carbon compounds and sell the generated carbon compounds as a resource. Carbon capture systems can remove carbon dioxide from the air and earn a certain amount of income in the form of carbon emission credits (e.g., about $600 per ton of carbon dioxide).

According to one embodiment, air electrode 1232 may have a reduced electrical conductivity due to the accumulation of carbon compounds (e.g., $M_a(CO_3)_b$). The carbon capture system of the present disclosure can vent the carbon compounds generated by the air electrode 1232 to the outside using a fuel supply line between the fuel injection module 116 and the fuel electrode 1212. The carbon capture system of this document may utilize the fuel supply line installed for fuel supply rather than installing a separate line for discharging carbon compounds, thereby reducing structural complexity and reducing costs. The carbon capture system can discharge carbon compounds generated by the air electrode 1232 to the outside to control accumulation on the air electrode 1232 and to prevent the electrical conductivity of the air electrode 1232 from decreasing. The carbon capture system can exhaust the carbon compounds to the outside to increase the replacement interval of the air electrode 1232, reduce the hassle of replacing the air electrode 1232 as it degrades, and reduce the cost of replacing the air electrode 1232.

The controller 132 of the carbon capture device can determine whether to replace the air electrode 1232 based on the ratio of carbon compounds that accumulate on the air electrode 1232 and the electrical conductivity of the air electrode 1232. For example, the controller 132 may determine to replace the air electrode 1232 based on the electrical conductivity of the air electrode 1232 being below a specified level. The carbon capture system of this document may utilize a particular configuration or robot or device to replace the air electrode 1232 in the fuel cell stack in an automated or semi-automated manner. Alternatively, the controller 132 may display information to a user indicating that the air electrode 1232 needs to be replaced. According to one embodiment, the air electrode 1232 may be electrically connected to the controller 132 and physically connected to the electrode replacement module 1234. The control unit 132 may determine that the air electrode 1232 needs to be replaced, and may replace the air electrode 1232 automatically or semi-automatically using the electrode replacement module 1234.

Hereinafter, the replacement of the air electrode 1232 will be described in detail.

According to one embodiment, the fuel cell module may utilize an electrolyte module to charge the electrolyte and discharge the used electrolyte to the outside. The electrolyte unit of the fuel cell module may include an inlet/outlet (opening, or flow path). The carbon capture system may utilize the outlet to vent carbon compounds generated by the air electrode. The outlet may be connected to a fueling passage in the fuel injection module. Alternatively, it may be connected to a passageway separate from the fueling passageway. The controller may sense the operation of the fuel cell in the carbon capture system and control at least one of the following: temperature, internal pressure, flow rate of fuel supplied, flow rate of collected air, output of electricity generated by the fuel cell, and durability of the electrodes. The controller may determine whether to replace the air electrode 1232 based on the condition of the air electrode 1232. For example, the controller 132 may determine to replace the air electrode 1232 based on the carbon compounds accumulated on the air electrode 1232 exceeding a specified level (e.g., 80%) or the electrical conductivity of the air electrode 1232 being less than a specified level (e.g., 30%). Based on determining that the air electrode 1232 needs to be replaced, the controller 132 may operate the electrode replacement module 1234 to disconnect and detach the air electrode from the fuel cell stack or fuel cell. Alternatively, control unit 132 may provide information to a user indicating that replacement of air electrode 1232 is required based on the determination of the replacement of air electrode 1232.

According to one embodiment, the air electrode 1232 may be configured as a cartridge within the fuel cell system or may be configured separately in the form of a compartment. A user may manually replace the air electrode 1232 alone. The carbon capture system of the present disclosure may be structured to automatically replace the air electrode 1232, or to allow for relatively simple external replacement of the air electrode 1232 to provide convenient usability. Additionally, carbon compounds that may accumulate on the air electrode 1232 can be removed through an outlet, or the aqueous electrolyte can be replaced to increase the usage cycle or replacement cycle of the air electrode 1232.

Figure 13:
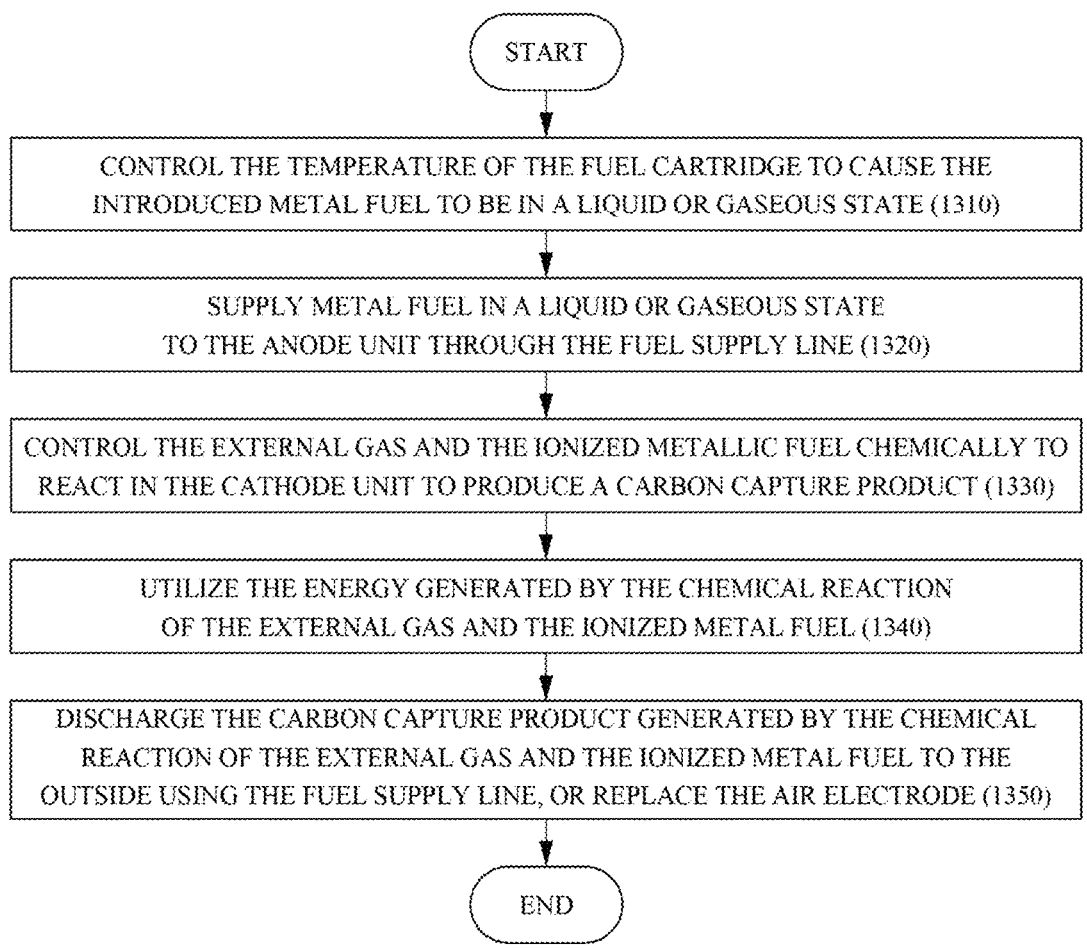
FIG. 13 is a flowchart illustrating a carbon capture method using a fuel cell according to an embodiment of the present disclosure.

FIG. 13 is a flow diagram of a method of carbon capture using a fuel cell, according to one embodiment of the present disclosure.

The operations described with reference to FIG. 13 may be implemented based on instructions that may be stored on a computer recording medium or in memory. The methods shown may be implemented by the fuel cell and carbon capture system of the present disclosure previously described in FIGS. 1 through 12, the technical features of which have been previously described and will be omitted herein. The order of each operation in FIG. 13 may be changed, some operations may be omitted, and some operations may be performed simultaneously.

In operation 1310, the controller 132 may control the temperature of the fuel cartridge to cause the introduced metallic fuel to be in a liquid or gaseous state. Fuel in a liquid or gaseous state may be relatively more reactive compared to fuel in a solid state, which may result in a relatively smaller amount of fuel remaining, and because it flows in the form of a fluid, a relatively smaller amount may accumulate on the air electrode. On the other hand, the fuel supplied in the operation of FIG. 13 is not limited to a metal fuel, and a metal salt fuel, an electride solution fuel, an alloy fuel in a liquid state, and the like may be used according to various embodiments described above in this disclosure, and the following operation may be changed accordingly.

In operation 1320, the controller 132 may supply metallic fuel in a liquid or gaseous state to the anode unit through the fuel supply line. According to one embodiment, the anode unit may receive metallic fuel in a liquid or gaseous state via a fuel injection module. The anode unit can be supplied with liquid or gaseous fuel using the fuel supply line, and can be easily supplied with fuel compared to solid state metal fuel.

In operation 1330, the controller 132 can control the external gas and the ionized metallic fuel to chemically react in the cathode unit to produce a carbon capture product (e.g., a carbon compound). The carbon capture system of this document can remove carbon from air by introducing a metallic fuel (e.g., sodium). For example, if the carbon capture product is $M_aCO_3$, two metal ions can be utilized to remove one molecule of carbon dioxide from the air. Sodium chloride makes up 30.6% of the ions present in seawater (ocean water), which covers 70% of the Earth's surface area, so it can be obtained at low cost without fear of depletion. When using sodium chloride (NaCl) as a metallic fuel, a carbon capture system can remove a specified level of carbon (e.g., 1 ton) from the air by injecting a specified level of sodium chloride (e.g., 12 tons).

In addition, the carbon capture systems described herein may utilize or sell the captured carbon capture product industrially. A carbon capture system can capture oxygen or carbon dioxide from the air to generate carbon capture product and sell the generated carbon capture product as a resource. Carbon capture systems can remove carbon dioxide from the air while earning a certain amount of income in the form of carbon emission credits (e.g., about $600 per ton of carbon dioxide).

In operation 1340, the controller 132 can utilize the energy generated by the chemical reaction of the external gas and the ionized metal fuel. For example, fuel cell stack 140 may utilize fuel supplied from fuel cartridge 110 and air supplied from air cartridge 120 to cause a chemical reaction and produce electrical energy. The battery 150 can store the power generated by the chemical reaction on the fuel cell module 130. The fuel cell module 130 can store the generated power in the battery 150 or supply it to other components within the carbon capture system. For example, the fuel cell system 130 can supply power stored in the battery 150 to the fuel cartridge 110. The heating module 114 in the fuel cartridge 110 can utilize the power to change the state of the incoming fuel to a gas or liquid. In addition, the carbon capture system may transmit the electric power stored in the battery 150 to the external system and use it to another electronic device, or exchange it with a specific resource (e.g., money) or sell it.

At operation 1350, the controller 132 may discharge the carbon capture product generated by the chemical reaction of the external gas and the ionized metal fuel to the outside using the fuel supply line, or replace the air electrode. The carbon capture system of this document may have a separate line for the discharge of the carbon capture product. Alternatively, the fuel supply line installed for fuel supply in the carbon capture system can be used to discharge the carbon capture product to reduce the complexity of the structure and reduce the cost. In addition, the carbon capture systems and methods described herein can accumulate carbon capture products that are vented to the outside for sale or other uses. The carbon capture system may increase the replacement cycle of the air electrode by discharging the carbon capture product to the environment, thereby reducing the hassle of replacing the air electrode as it degrades, and reducing the cost of replacing the air electrode. The carbon capture system can vent the carbon capture product generated by the air electrode to the outside to control accumulation on the air electrode or to replace the air electrode so that the electrical conductivity of the air electrode does not decrease.

The controller of the carbon capture apparatus of the present disclosure is hardware configured to perform the methods performed by the carbon capture system of the present disclosure, and may include at least one processor comprising logic circuitry and arithmetic circuitry. The controller 132 may process data according to programs and/or instructions provided from a memory (not shown), and may generate control signals based on the results of the processing.

According to various embodiments, the controller 132 may control at least one other component (e.g., hardware or software component) connected to the controller 132, and may perform various data processing or calculations. According to an embodiment, as at least a unit of the data processing or calculation, the controller 132 may store a command or data received from another component (e.g., a fuel cell stack or an air control module) in a volatile memory (not shown), process the command or data stored in the volatile memory (not shown), and store the result data in a non-volatile memory (not shown).

According to an embodiment, the controller 132 may include a main processor (e.g., a central processing unit (CPU) or an application processor (AP)) or an auxiliary processor (e.g., a graphic processing unit (GPU), a neural processing unit (NPU), an image signal processor, a sensor hub processor, or a communication processor) that is operable independently of or in conjunction with the main processor. For example, when the carbon capture device includes a main processor and an auxiliary processor, the auxiliary processor may be set to use lower power than the main processor or to be specific to a specified function. The auxiliary processor may be implemented separately from the main processor or as a unit thereof.

The carbon capture device according to various embodiments of the present disclosure may include a communication unit (not shown). The communication unit means a hardware component that receives commands or data input from a user or another external device, transmits commands or data generated by the carbon capture device to the outside, or transmits or receives commands or data from other component(s) of the carbon capture device, and may include a wired/wireless communication module and/or an input/output interface. The carbon capture device according to an embodiment of the present disclosure may receive information from an external electronic device (e.g., a management server installed outside the carbon capture device) through the communicator, or transmit information obtained or generated by the carbon capture device to the external electronic device. Meanwhile, the communicator may be implemented separately from the controller 132 in the carbon capture device according to various embodiments of the present disclosure, and may be implemented through a circuit element included in the controller 132 and included in the controller 132.

According to an embodiment of the present disclosure, the artificial neural network (not shown) for capturing carbon of the present disclosure may be included in the controller 132 in the carbon collection device as a software-on-chip (SOC) or micro controller unit (MCU). Alternatively, the artificial neural network may be provided in the form of software operating by the controller 132 and updated by communication from an external server or by a user input.

According to an embodiment of the present disclosure, fuel for optimizing carbon capture, amount of fuel, supply temperature, supply speed, amount of air, temperature of air, concentration of electrolyte, and the like may be determined using the artificial neural network.

According to one embodiment, a carbon capture system may include an air cartridge into which an external gas is introduced, a fuel cartridge into which a metallic fuel is injected, a fuel cell system, a fuel supply line to provide fuel between the fuel cartridge and the fuel cell system, a battery, and a controller. The fuel cell system may include an anode unit including a fuel electrode where the metal fuel is ionized to produce metal ions, a cathode unit including an air electrode where carbon compounds of the metal ions are produced, and an electrolyte unit including an electrolyte that transfers metal ions between the cathode and anode units. The controller controls the temperature of the fuel cartridge to make the introduced metal fuel in a liquid or gaseous state, supplies the metal fuel in the liquid or gaseous state to the anode unit using a fuel supply line, supplies the external gas to the cathode unit, and controls the chemical reaction of the external gas and the ionized metal fuel on the cathode unit to produce a carbon compound, control the temperature of the fuel cartridge using the energy generated by the chemical reaction of the external gas and the ionized metal fuel at the cathode unit, store the excess energy in the battery, and discharge the carbon compound generated by the chemical reaction of the external gas and the ionized metal fuel at the cathode to the outside using the fuel supply line.

According to an embodiment, the controller may control the temperature inside the cell so that the carbon compound accumulated on the cathode unit may move in a fluid state using the fuel supply line, and sense the level at which the external gas and the ionized metal fuel react to generate the carbon compound accumulated on the cathode unit.

According to one embodiment, the controller may determine to replace the air electrode based on the electrical conductivity of the air electrode being less than a specified level.

According to an embodiment, the controller may determine to replace the air electrode based on the ratio of the carbon compound accumulated in the air electrode exceeding a specified level.

According to an embodiment, the controller may display information to the user indicating that the air electrode needs to be replaced based on the determination to replace the air electrode.

According to one embodiment, the air electrode may be physically connected to the electrode replacement module, configured in the form of a cartridge, or configured separately in the form of a compartment, and the controller may automatically operate the electrode replacement module to disconnect or detach the air electrode based on the determination to replace the air electrode.

According to one embodiment, the controller may control at least one of a pressure of the fuel supply, a flow rate, a temperature at which the state of the metallic fuel may be maintained in a liquid or gaseous state, and a quantity of the supply.

According to one embodiment, the air cartridge includes an air fan, an air filter, and an air control module, wherein the air fan rotates to collect air and carbon dioxide in the air into the carbon capture system, the air filter filters out solid material from the air collected through the air fan, and the air control module measures the condition of the air, including at least one of temperature, humidity, or air velocity, and can control at least one of a rotational speed of the air fan, an air compression ratio, a pressure in the carbon capture system, or a flow rate in the carbon capture system based on the measured condition of the air.

According to one embodiment, the fuel cartridge includes a heating module, a chamber, and a fuel injection module, wherein the heating module may conventionally provide heat to the chamber or may provide heat using an electric coil and sense the temperature inside the carbon capture system, the chamber stores and heats the injected metallic fuel, and the fuel injection module may supply fuel in a liquid or gaseous state to the anode unit of the fuel cell system using a fuel supply line.

According to one embodiment, the fuel injection module delivers fuel to the anode unit of the fuel cell system under pressure using a compressor or pump, and can heat unburned metallic fuel in the fuel cell system and feed it back into the fuel cell system.

According to one embodiment, the battery can store energy generated through the oxidation of metal fuel in the anode unit, and feed the stored energy to the heating module or transmit the energy to the outside.

According to one embodiment, the carbon capture system further comprises a separate line, and the control can utilize the fuel supply line to move carbon compounds generated in the cathode unit, or can utilize the separate line to move carbon compounds generated in the cathode unit.

According to an embodiment, the fuel supply line may be formed in a curved line, supply liquid or gaseous fuel to the fuel cell system, supply unburned fuel back to the fuel cartridge, and move the carbon compound generated in the cathode unit.

According to one embodiment, the metallic fuel may comprise at least one of Li, Na, K, Rb, Cs, Fr, Be, Mg, Ca, Sr, Ba, Ra, Al, Sn, Zn, Cu, Pb, Ag, Ni, Cd, Fe.

According to one embodiment, the fuel electrode in the anode unit or the air electrode in the cathode unit may comprise at least one of a carbon electrode, a graphite electrode, a metal-carbon composite electrode, a nanomaterial electrode, a catalyst composite electrode, a catalytic electrode, a semiconductor material electrode, a polymer electrode, a metal mesh-shaped electrode, an organic/inorganic composite material electrode, a liquid-shaped electrode, a transition metal dichalcogenides (TMD) electrode, a graphene electrode, a carbon nanotube (CNT) electrode, or a metal oxide species electrode.

Specific structural or functional descriptions of the embodiments are disclosed for the purpose of example only, and may be changed and implemented in various forms. Therefore, the embodiments are not limited to specific disclosures, and the scope of the present specification includes modifications, equivalents, or alternatives included in the technical spirit.

Although the terms first or second, etc. may be used to describe various elements, these terms should be interpreted only for the purpose of distinguishing one element from another. For example, the first element may be referred to as the second element, and similarly, the second element may be referred to as the first element.

When a component is said to be "connected" to another component, it should be understood that it may be directly connected or connected to that other component, but there may be other components in between.

The terminology used in the embodiments is used for illustrative purpose only and should not be construed as limiting. The singular expression includes plural expressions unless the context clearly dictates otherwise. In this specification, it should be understood that the terms "include" or "have" etc. are intended to specify the presence of stated features, numbers, steps, operations, elements, components, or combinations thereof, but do not preclude the presence or addition of one or more other features, numbers, steps, operations, elements, components, components, or combinations thereof.

Unless defined otherwise, all terms used herein, including technical or scientific terms, have the same meaning as commonly understood by one of ordinary skill in the art to which the present disclosure pertains. Terms such as those defined in commonly used dictionaries should be interpreted as having a meaning that is consistent with the meaning in the context of the relevant art and are not interpreted in an idealized or overly formal sense unless expressly so defined herein.

The advantages and features of the present disclosure, and the methods of achieving them will become apparent by reference to the embodiments described in detail with the accompanying drawings. However, the inventions included in the present disclosure are not limited to the embodiments disclosed in this document but will be implemented in various forms different from each other, and the embodiments are provided so that the disclosure of this document is complete, and the scope of the invention belonging to the technical field of the present disclosure is completely known to those skilled in the art, and the contents of the invention are defined only by the scope of the claims.

What is claimed is:

1. A fuel cell stack for capturing carbon in the air, comprising:
   an anode unit including a fuel electrode to which a liquid or gaseous metal fuel is supplied;
   a cathode unit including an air electrode to which a gas mixture including carbon dioxide and oxygen is supplied;
   an electrolyte unit including an electrolyte to transfer metal ions generated by an oxidation reaction of the metal fuel between the fuel electrode and the air electrode;
   an air electrode exchange module for replacing the air electrode; and
   wherein the air electrode generates a carbon capture product containing a carbon component based on an oxidation reaction of the gas mixture,
   a controller configured to determine whether to replace the air electrode or the electrolyte unit based on the carbon capture product,
   wherein the air electrode is replaced through the air electrode exchange module when a value of the carbon capture product exceeds a predetermined value,
   wherein the electrolyte unit is replaced when the electrical conductivity of the air electrode is less than a predetermined level.

2. The fuel cell stack of claim 1,
   wherein the metal fuel is continuously supplied in a fluid form as the generation of the carbon capture product continuously.

3. The fuel cell stack of claim 1,
   wherein the controller configured to control at least one of a pressure, a flow speed, a temperature at which the state of the fuel be maintained in a liquid or gaseous state, and a supply amount.

4. The fuel cell stack of claim 1, further comprising:
   a battery configured to store electrical energy generated by the fuel cell stack and supply stored electrical energy to the fuel cartridge or transmit it externally.

5. A fuel cell stack for capturing carbon in the air, comprising:
   an anode unit including a fuel electrode to which a liquid or gaseous metal fuel is supplied;
   a first line connected to the fuel electrode for supplying the metal fuel;
   a cathode unit including an air electrode to which a gas mixture including carbon dioxide and oxygen is supplied;
   an air electrode exchange module for replacing the air electrode; and
   an electrolyte unit including an electrolyte to transfer metal ions generated by an oxidation reaction of the metal fuel between the fuel electrode and the air electrode;
   wherein the electrolyte unit supplies and circulates the electrolyte; and
   wherein the air electrode generates a carbon capture product containing a carbon component based on an oxidation reaction of the gas mixture,
   wherein the air electrode is replaced through the air electrode exchange module when a value of the carbon capture product exceeds a predetermined value,
   wherein the electrolyte unit is replaced when the electrical conductivity of the air electrode is less than a predetermined level.

6. The fuel cell stack of claim 5,
   wherein the electrolyte unit includes an opening part,
   wherein the electrolyte unit is configured to control opening or closing of the opening part for control the supply of electrolyte.

7. The fuel cell stack of claim 5, further comprising:
   an electrolyte module configured to control the supply of the electrolyte; and
   a second line connected to the electrolyte module, wherein the electrolyte flows to the electrolyte unit through the second line based on the type of the metal fuel supplied to the fuel electrode.

8. The fuel cell stack of claim 7,
   wherein the electrolyte supplied through the second line is different from the electride solution supplied through the first line when the electride solution including the metal fuel and the amine is supplied through the first line.

9. The fuel cell stack of claim 7, further comprising:
   a controller configured to determine whether to replace the electrolyte unit based on the state of the air electrode.

10. The fuel cell stack of claim 9,
    wherein the replacement of electrolyte unit is the replacement of an electrolyte solution by supplying an electrolyte solution through the second line,
    wherein the electrolyte module is configured to maintain and manage the electrolyte by controlling the supply of the electrolyte solution.

11. The fuel cell stack of claim 10, wherein the electrolyte unit includes a third line to discharge the electrolyte solution.

12. The fuel cell stack of claim 9, wherein the electrolyte unit is separable from the fuel electrode and the air electrode by a separator and the electrolyte unit is replaced in a cartridge form or compartment form of the electrolyte unit.

13. The fuel cell stack of claim 5, wherein the electrolyte unit includes at least one electrolyte, and the at least one electrolyte includes an organic electrolyte and a water-based electrolyte.

14. The fuel cell stack of claim 13,
wherein the electrolyte unit includes a first electrolyte unit, a second electrolyte unit, a separator to separate the first electrolyte unit and the second electrolyte unit, and a flow path connected to the first electrolyte unit and the second electrolyte unit respectively,
wherein the electrolyte module controls the supply of the electrolyte of each of the first electrolyte unit and the second electrolyte unit.

15. The fuel cell stack of claim 14, wherein the replacement of electrolyte unit is the replacement of cartridge at least one of the first electrolyte unit, the second electrolyte unit, and the separator.

16. The fuel cell stack of claim 15, wherein the replacement of electrolyte unit is the replacement of solution of at least one of the first electrolyte unit and the second electrolyte unit.

17. The fuel cell stack of claim 16,
wherein the replacement of solution in at least one of the first electrolyte unit and the second electrolyte unit is accomplished by supplying the solution to at least one of the first electrolyte unit and the second electrolyte unit respectively,
wherein the electrolyte module is configured to maintain and manage electrolyte of the first electrolyte unit and the second electrolyte unit respectively by controlling an electrolyte supply of at least one of the first electrolyte unit and the second electrolyte unit.

* * * * *